United States Patent

Bergthaller et al.

Patent Number: 4,579,805
Date of Patent: Apr. 1, 1986

[54] COLOR PHOTOGRAPHIC RECORDING MATERIAL CONTAINING A THIOPHENE AZO DYE RELEASER FOR CYAN DYES

[75] Inventors: Peter Bergthaller, Bergisch Gladbach; Hauke Fürstenwerth, Cologne; Rudolf Stolzenburg, Langenfeld; Paul Marx, Leverkusen; Holger Heidenreich, Cologne, all of Fed. Rep. of Germany

[73] Assignee: Agfa-Gevaert Aktiengesellschaft, Leverkusen-Bayerwerk, Fed. Rep. of Germany

[21] Appl. No.: 674,221

[22] Filed: Nov. 23, 1984

[30] Foreign Application Priority Data

Dec. 7, 1983 [DE] Fed. Rep. of Germany ....... 3344295

[51] Int. Cl.$^4$ .......................... G03C 1/40; G03C 5/54
[52] U.S. Cl. .................... 430/241; 430/223; 430/242; 430/562
[58] Field of Search ............... 430/223, 225, 562, 222, 430/226, 241, 242

[56] References Cited

U.S. PATENT DOCUMENTS 3,999,991 12/1976 Fujita et al. ................. 430/225
4,346,161 8/1982 Krutak et al. ................. 430/223
4,524,124 6/1985 Bergthaller et al. ............ 430/223

Primary Examiner—Richard L. Schilling
Attorney, Agent, or Firm—Connolly and Hutz

[57] ABSTRACT

Dyes corresponding to formula I may be released imagewise from dye releasers in the dye diffusion transfer process. The dyes obtained are lightfast cyan dyes with improved spectral properties and reduced sensitivity to reducing agents

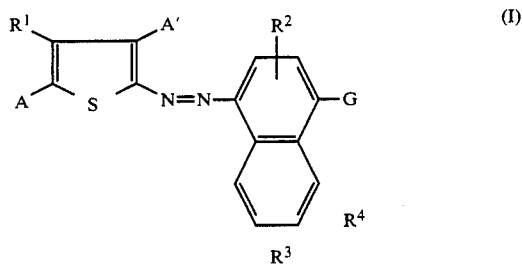

the meanings of symbols given in formula I (A, A', G, $R^1$, $R^2$, $R^3$ and $R^4$) are indicated in the description.

6 Claims, No Drawings

COLOR PHOTOGRAPHIC RECORDING MATERIAL CONTAINING A THIOPHENE AZO DYE RELEASER FOR CYAN DYES

This invention relates to a colour photographic recording material for the production of colour images by the dye diffusion transfer process in which at least one light-sensitive silver halide emulsion layer is associated with a non-diffusible colour providing compound from which a diffusible cyan dye is released during development.

The dye diffusion transfer process is based on the fact that during development, an imagewise distribution of diffusible dyes is produced in a light-sensitive element in accordance with a previous exposure and is transferred to an image receptor element.

It is very important in this process that the dyes should be capable of being sufficiently fixed in the image receptor layer and that they should have excellent spectral properties and very high stability to light and heat.

Cyan dyes for the dye diffusion transfer process containing a phthalocyanine group as chromophoric group, preferably in the form of its copper complex, have been disclosed, for example, in DE-A-No. 3 101 036.

One disadvantage of these exceptionally stable dyes is their reduced diffusibility compared with the yellow and magenta dyes conventionally used. This means that the build-up of colour transfer is associated with a transition of colour from red to neutral during the time of transfer so that the optimum transfer time must be accurately observed.

Rapidly diffusible cyan dyes belonging to the series of 4-(4-nitrophenylazo)-1-naphthols have been described for the dye diffusion process, e.g. in DE-A-No. 2 406 653 and DE-A-No. 2 853 584.

The dyes mentioned in DE-A-No. 2 406 653 occur in the form of an anionic chromophore after their release from the carrier which renders them diffusion resistant, and they diffuse into the image receptor layer in the form of this chromophore and are also fixed on the mordant in the form of the dye anion. Anionic dyes generally have little fastness to light. It is therefore not surprising that the cyan anionic dyes from the series of 4-(4-nitrophenylazo)-naphthols also have insufficient fastness to light. To overcome this disadvantage, dyes from the same series but with improved lightfastness by virture of an additional carbamoyl substitution in the ortho-position to the OH group have been described in DE-A-No. 2 853 584.

An improvement in lightfastness and generally improved resistance to heat and moisture, especially when in a sealed pack, a so-called monopack, may be obtained by using monoazo dyes from the series of nitrophenylazonaphthosultams described in DE-A-No. 2 806 196 as cyan dyes for the dye diffusion process.

Common to all these dyes is the presence of a nitro group in the para-position to the azo group which renders the chromophore liable to attack by reducing agents.

Apart from the developer substances, however, reducing agents are present in virtually all recording materials for the dye diffusion transfer process to perform certain functions. Reducing agents are normally present, for example, in the intermediate layers between the individual layer packets associated with the different partial colours. These reducing agents include in particular those from the series of monoalkylated or dialkylated hydroquinones, which are capable of absorbing developer oxidation products and accordingly quite reactive.

Recording materials containing reducible dye releasing compounds (dye releasers) also contain so-called electron donor compounds (ED compounds) or their precursors in association with the dye releasers. Information on this subject may be found in the following applications: EP-A-No. 0 004 399, U.S. Pat. No. 4,139,379, U.S. Pat. No. 4,278,750, DE-A-No. 3 014 669, EP-A-No. 0 038 092, DE-A-No. 3 008 588 and DE-A-No. 3 006 268.

It is known that 4-nitrophenylazo dyes are more readily attacked by reducing agents than other monoazo dyes. Even the brief contact between reducing agent and chromophore during the time of formation of the image may be sufficient in the presence of a strongly alkaline processing medium to change the cyan dye to compounds of unknown structure capable of absorbing shorter wave light so that the shade is changed from cyan to blue or even violet.

It would therefore be desirable to provide, for the dye diffusion process, readily diffusible cyan monoazo dyes which contain no 4-nitrophenylazo groups and are therefore less sensitive to reduction.

It is an object of the present invention to provide new colour providing compounds for the dye diffusion transfer process from which diffusible cyan dyes with improved lightfastness, improved spectral properties and improved resistance to reducing agents are released during photographic development.

The invention relates to a colour photographic recording material for the production of colour images by the dye diffusion transfer process, containing, associated with at least one light-sensitive silver halide emulsion lay, a non-diffusible colour providing compound (dye releaser) from which a diffusible azo dye is released under the conditions of alkaline development as a function of the development of the silver halide emulsion layer, characterised in that the azo dye corresponds to the following formula I:

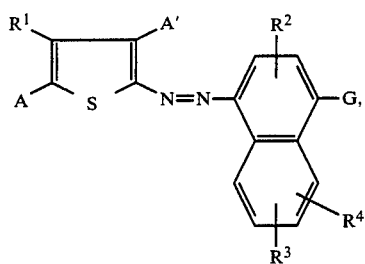

wherein

A represents $-CO-R^5$, $-CN$ or

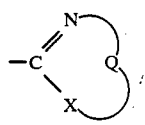

A' represents a group as defined for A, or $-CF_3$, $-CO-OR^6$, $-CO-NR^6-R^7$ or $-SO_2-R^8$, G represents $-OH$ or $-NH-SO_2-SO_2-R^9$, Q represents a group which, together with N, C and X, forms a heterocyclic ring having an electron acceptor character, X represents —O—, —S— or —NR$^{10}$—, R$^1$ represents H, halogen, alkyl, aralkyl, aryl, —CO—OR$^6$ or a group which combines with A or A' and the two participating carbon atoms of the thiophene ring to form a 5- to 7-membered ring, R$^2$ represents H or a group with electron acceptor character preferably in the ortho-position to G, e.g. a group as defined for A' or —SO$_2$—NR$^6$—R$^7$ or Cl, R$^3$ represents H, acylamino or a group G' having the same definition as G but not capable of forming a naphthosultam structure, R$^4$ represents H, —SO$_2$—NR$^6$—R$^7$ or a bond in the peri-position to the naphthalene ring forming a naphthosultam structure together with G and the three participating carbon atoms of the naphthalene ring, R$^5$ represents alkyl, aralkyl, aryl, thienyl or a group forming a 5- to 7-membered ring together with R$^1$, the carbonyl group and the two participating carbon atoms of the thiophene ring, R$^6$ represents H, alkyl, aralkyl or a group forming a cyclic amino group together with R$^7$ and the nitrogen atom of the group, R$^7$ represents H, alkyl, aralkyl, aryl or a group forming the residue of a cyclic amino group together with R$^6$ and the nitrogen atoms of the group, R$^8$ represents H, alkyl, aralkyl, aryl or —NR$^6$—R$^7$, R$^9$ represents alkyl, aralkyl, aryl, —NR$^6$—R$^7$ or a bond in the peri position to the naphthalene ring, which together with the sulphonamide group and the three participating carbon atoms of the naphthalene ring forms a naphthosultam structure, and R$^{10}$ represents H or alkyl.

The two symbols A and A' thus predominantly represent groups having an electron acceptor character but they must not represent a nitro group. It is also advantageous if R$^2$ is a group having an electron acceptor character.

Both the group G and the group G' represented by R$^3$ may be present in anionic form under the conditions of alkaline development. Furthermore, the group G may initially be present in acylated form, e.g. as —O-acyl group, which is then hydrolysed under the conditions of alkaline development.

A heterocyclic ring represented by A or A' and formed by X, Q, a nitrogen atom and a carbon atom may be, for example, the heterocyclic ring of a benzoxazole, benzothiazole, benzimidazole, oxadiazole or thiadiazole group, and the groups mentioned may carry further substituents.

The alkyl groups mentioned in the definitions of R$^1$ and R$^5$ to R$^{10}$ preferably contain not more than 4 carbon atoms. Preferred examples are: Methyl, ethyl, n-propyl, isopropyl, n-butyl and t-butyl.

The aralkyl group may be, for example, benzyl or phenylethyl.

The above mentioned aryl groups are preferably phenyl groups or naphthyl groups and they may be further substituted, e.g. by alkyl, alkoxy, acylamino, sulphamoyl or sulphinate, but they preferably contain not more than 17 carbon atoms, including the carbon atoms present in these substituents.

The cyclic amino groups mentioned in the definition of R$^6$ and R$^7$ is a 5- to 7-membered cyclic amino group, e.g. a pyrrolidine, piperidine or morpholine group.

Acyl groups (acylamino) are in the present case derived from aliphatic or aromatic carboxylic acids, carbamic acids or carbonic acid semi-esters.

The dyes corresponding to formula I also have suitable functional groups for adjusting their diffusion and mordanting characteristics, e.g. in the form of G or in the form of one or more of the groups already mentioned under R$^1$ to R$^{10}$ or in the form of substituents optionally attached to one of these groups through a suitable linking member, for example: Anionic or anionisable groups such as sulphonate, sulphinate, phenolate, naphtholate, carboxylate, disulphimide or sulphamoyl groups, or a functional group which results from the splitting of a bond on a carrier group carrying a ballast group and which is characteristic for the nature of the carrier group and the link by which it is attached. The last mentioned functional group may be identical with one of the groups mentioned above which modify the diffusion and mordanting characteristics. The said functional group may be attached, for example, to an alkyl or aryl group which in turn may form part of the groups mentioned under R$^1$ to R$^{10}$.

Advantageous results are obtained in particular when the azo dye released corresponds to the following formula Ia:

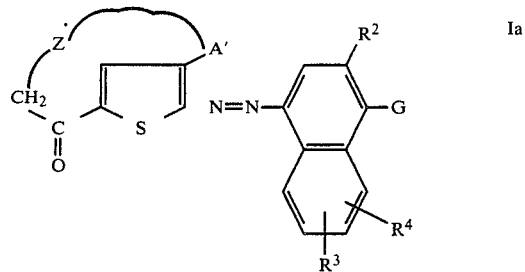

wherein

A' represents —CN, —CF$_3$ or

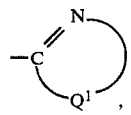

Q$^1$ represents a group which, together with N and C, forms the heterocyclic ring of a benzoxazole, benzothiazole, benzimidazole, oxadiazole or thiadiazole group, Z represents a substituted or unsubstituted methylene or ethylene group, R$^2$ represents H, Cl, —CN or —SO$_2$—NR$^6$—R$^7$, R$^3$ represents H, acylamino, —OH or —NH—SO$_2$—R$^{9'}$ and R$^{9'}$ represents alkyl, aralkyl, aryl or —NR$^6$—R$^7$ and G, R$^4$, R$^6$ and R$^7$ have the meaning already indicated.

The present invention also relates to monoazo dyes corresponding to formula I, among which the monoazo dyes corresponding to formula II below are particularly preferred:

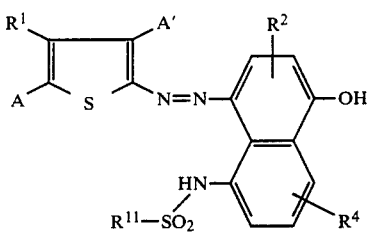

II wherein $R^{11}$ represents alkyl, aryl or $-NR^6-R^7$ and $A, A', R^1, R^2, R^4, R^6$ and $R^7$ have the meaning already indicated.

Formulae I and II represent the diffusible dyes according to the invention released during development. These dyes are released from the non-diffusible colour providing compounds (dye releasers) incorporated in the photographic material. These dye releasers are compounds in which a dye residue of formula I, for example, is attached to a carrier group CAR containing at least one ballast group, optionally with interposition of a suitable linking member.

The dye of formula I may be attached to the carrier group by, for example, one of the substituents A, A', $R^1$, $R^2$, $R^3$, $R^4$ or G. the dye releasers according to the invention may therefore be represented by the following formula III

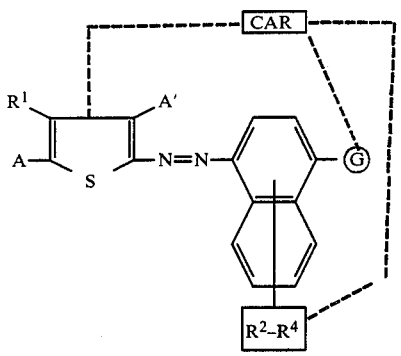

III wherein A, A', $R^1$ to $R^4$ and G have the meaning already indicated, CAR denotes a carrier group containing at least one group conferring diffusion resistance, and the broken lines denote possible linkage positions. In the dye releasers according to this invention represented by formula III, therefore, the carrier group is contained as substituent in one of the groups represented by A, A', $R^1$ to $R^4$ or G.

In addition to containing a ballast group, the carrier group represented by CAR has at least one group which is capable of being split as a function of the development of a silver halide emulsion layer so that the dye attached to the carrier group is separated from the ballast group, possibly together with a small fragment of the original carrier group, so that it can be released from its attachment to the layer. The carrier groups may have various structures depending on the mode of functioning of the splittable group.

The dye releasers according to this invention may be any of numerous types of compounds which are all distinguished by a linking member which is redox dependent in the strength of its bond and links the chromophore to the diffusion resistant carrier group.

Reference may be had in this connection to a comprehensive survey of the subject in Angew. Chem. Int. Ed. Engl. 22 (1983), pages 191–209, in which the most important of the known systems are described.

Particularly advantageous are found to be those redox active dye releasers represented by the formula

BALLAST-REDOX-DYE in which
BALLAST is a ballast group,
REDOX is a redox active group, i.e. a group which is capable of being oxidized or reduced under the conditions of alkaline development and can undergo to varying extents an elimination reaction, a nucleophilic displacement reaction, hydrolysis or other splitting reaction, depending upon whether it is in the oxidized or reduced state, with the result that the DYE residue is split off, and
DYE is the group of a diffusible dye, in the present case a dye corresponding to formula I.

Ballast groups are groups which enable the dye releasers according to the invention to be incorporated in a diffusion-fast form in the hydrophilic colloids conventionally used in photographic materials. Particularly suitable for this purpose are organic groups generally containing straight chained or branched aliphatic groups, generally with 8 to 20 carbon atoms, and optionally also carbocyclic or heterocyclic, optionally aromatic groups. These groups are attached to the remainder of the molecule either directly or indirectly, e.g. through one of the following groups: $-NHCO-$, $-NHSO_2-$, $-NR-$ (R denoting hydrogen or alkyl), $-O-$ or $-S-$. The ballast group may in addition also contain water solubilizing groups, e.g. sulpho groups or carboxyl groups, which may be present in an anionic form. Since the diffusion properties depend on the molecular size of the whole compound used, it is in some cases sufficient, e.g. if the molecule as a whole is large enough, to use short chained groups as ballast groups.

Redox active carrier groups having the structure BALLAST-REDOX- and the according dye releasers are known in a wide variety of forms. A detailed description is not necessary here in view of the above-mentioned comprehensive article in Angew. Chem. Int. Ed. Engl. 22, pages 191–209 (1983).

Some examples of redox active carrier groups from which a dye residue is split off to the extent that an imagewise oxidation or reduction has taken place are given below merely for the sake of illustration.

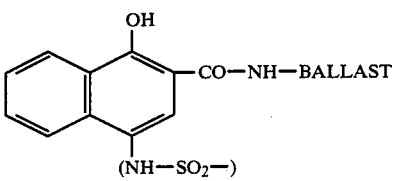

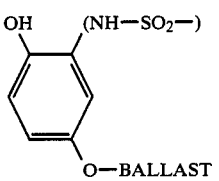

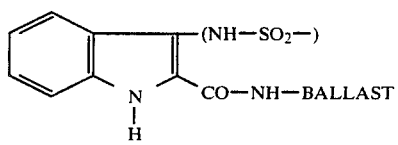

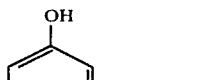

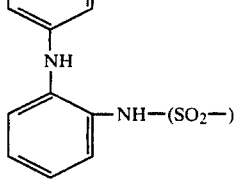

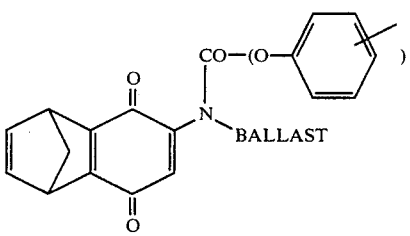

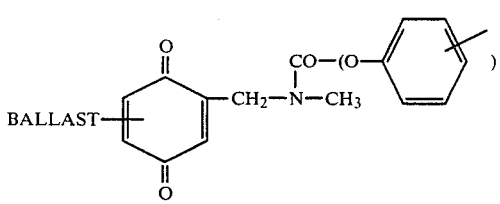

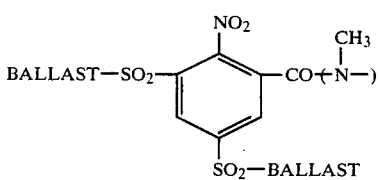

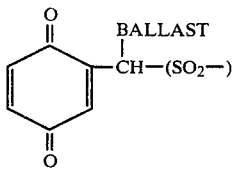

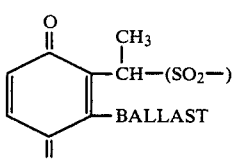

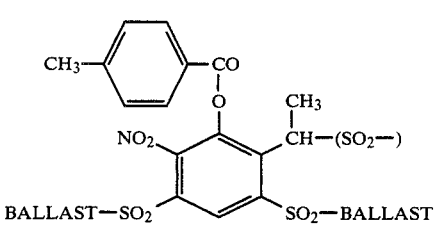

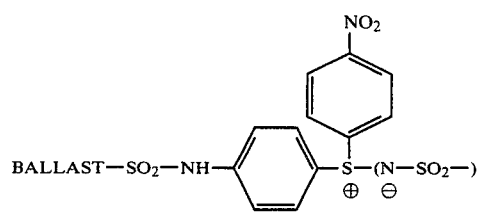

The groups in brackets are functional groups of the dye residue and are separated together with this residue from the remaining part of the carrier group. The functional group may be one of the substituents mentioned in the definition of the groups $R^1$ to $R^{10}$ in formulae I, II and III and may have a direct influence on he absorption properties of the dyes according to the invention. On the other hand, the functional group may be separated from the chromophore of the dye according to the invention by an intermediate member, i.e. it may be present as substituent in one of the groups given in the definition of $R^1$ to $R^{10}$ without necessarily affecting the absorption characteristics. In some cases, the functional group may act together with the intermediate member to influence the diffusion and mordanting characteristics of the dyes according to the invention. Suitable intermediate members are, for example, alkylene and arylene groups.

Reducible dye releasers capable of being split up by reduction are advantageously used in combination with so-called electron donor compounds (ED compounds). The latter function as reducing agents which are used up imagewise as development of the silver halide takes place, and the portion which is not used up then reduces the associated dye releaser, thereby causing the dye to be released. Examples of suitable ED compounds include non-diffusible or only slightly diffusible derivatives of hydroquinone, of benzisoxazolone, of p-aminophenol and of ascorbic acid (e.g. ascorbyl palmitate) which have been described, for example, in DE-A-No. 2 809 716. Particularly suitable ED compounds form the subject of DE-A-No. 3 006 268.

Examples of suitable ED compounds are given below.

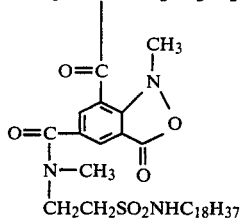

ED 1

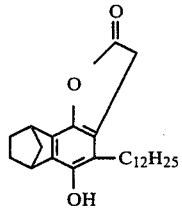

ED 2

ED 3
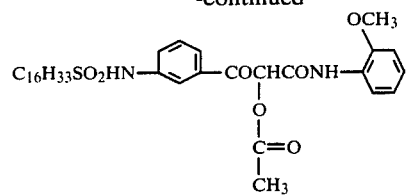

ED 4
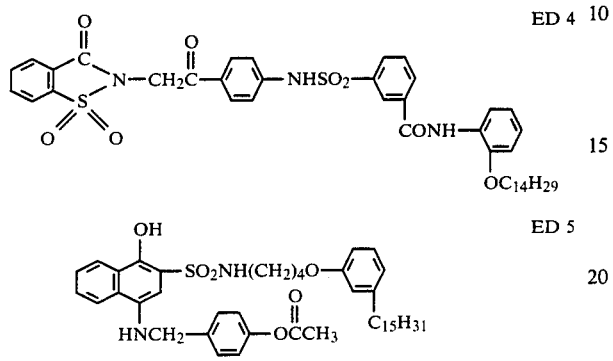

ED 5
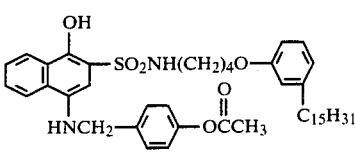

ED 6
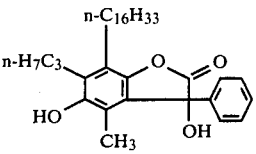

ED 7
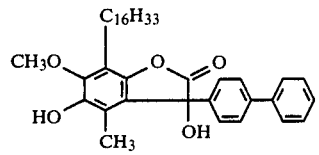

Examples of cyan monoazo dyes of formula I according to the invention which have exceptionally advantageous absorption characteristics are shown below.

Dyes marked with an asterisk (*) are model dyes which may readily be converted by simple methods of preparation into the dye releasers according to the invention of formula III or into dyes of formula I released from them.

Dye 1*
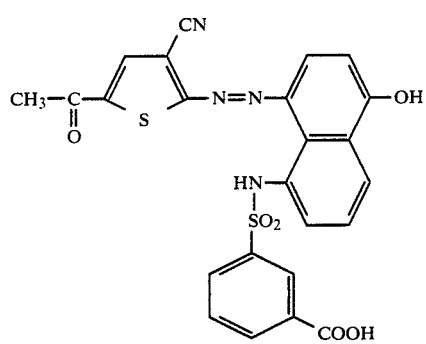

Dye 2
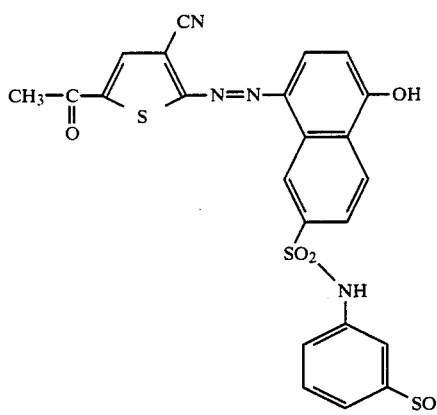

Dye 3*
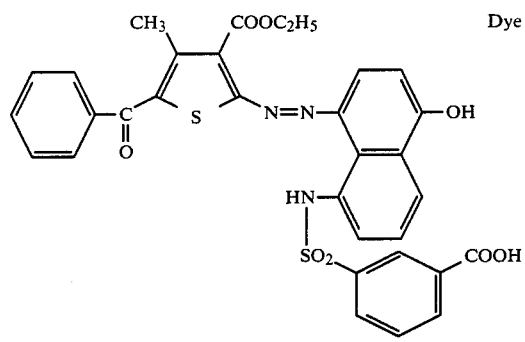

Dye 4*
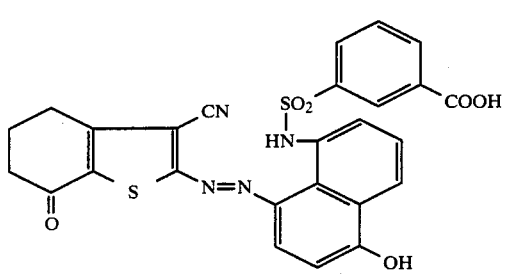

Dye 5
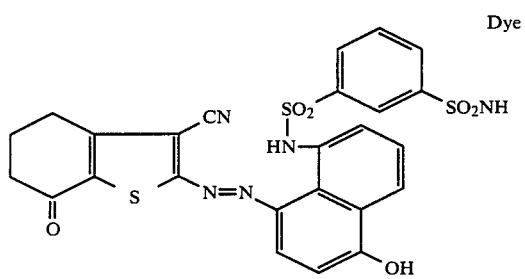

Dye 6
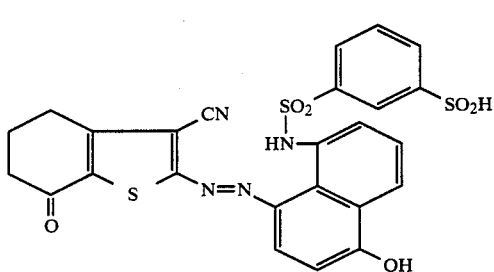

-continued
Dye 7
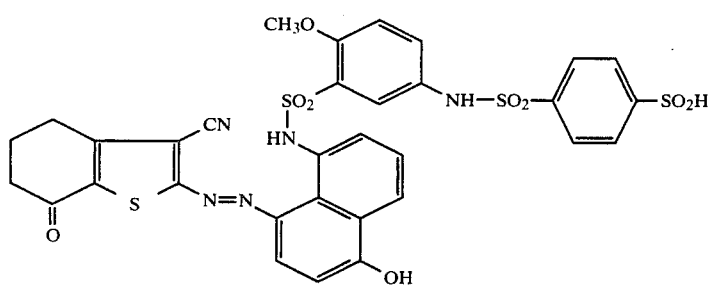
Dye 8
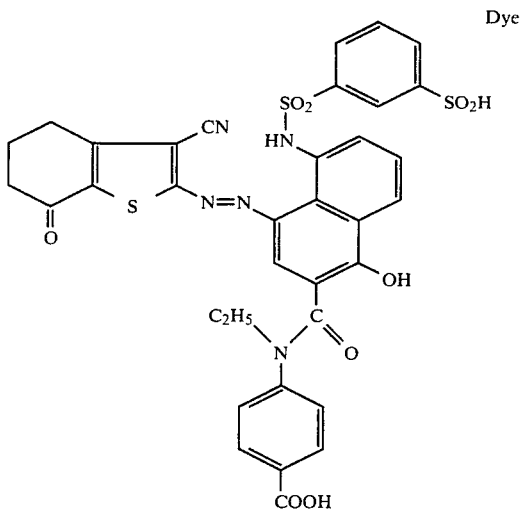
Dye 9
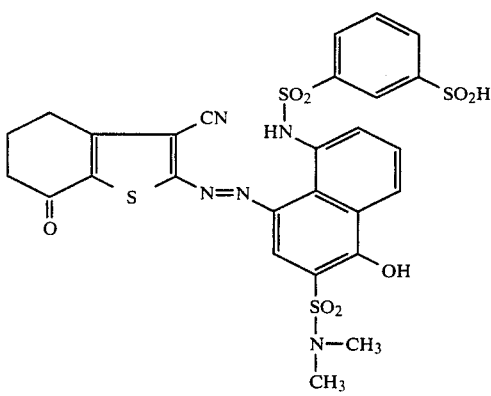
Dye 10
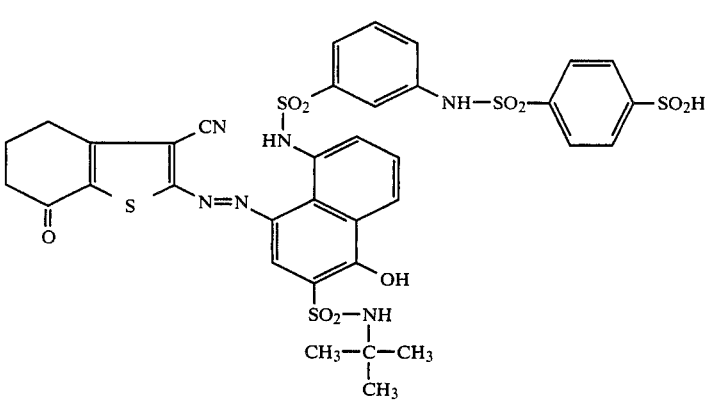
Dye 11
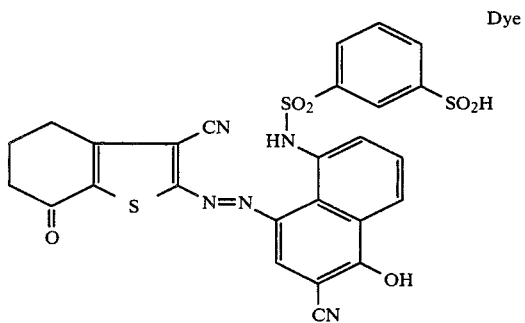
Dye 12
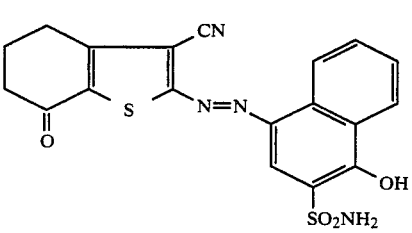

-continued
Dye 13
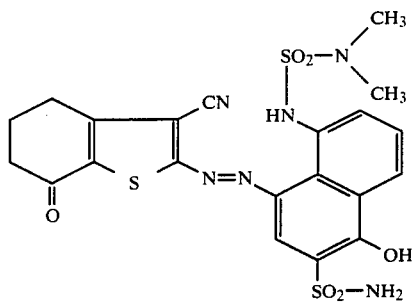
Dye 14
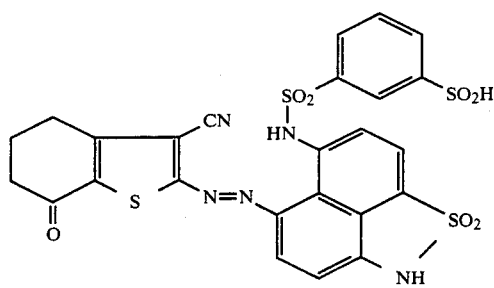
Dye 15
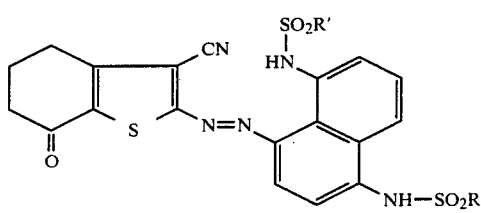
R,R′= CH₃ and
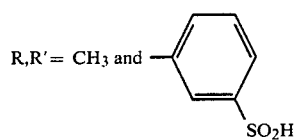
associated in a manner unknown
Dye 16
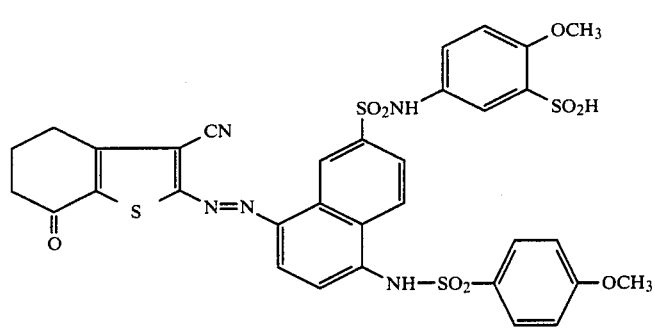
Dye 17
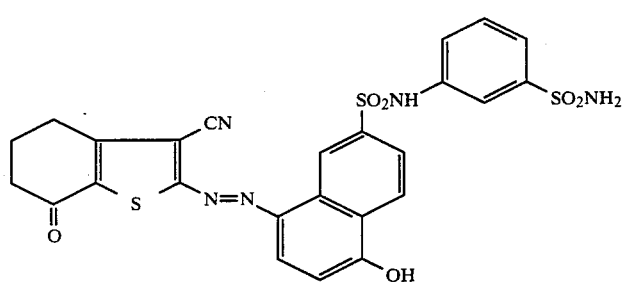
Dye 18
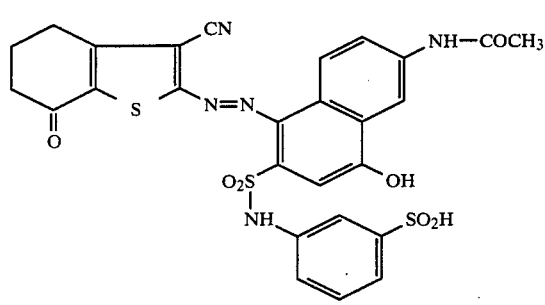

-continued
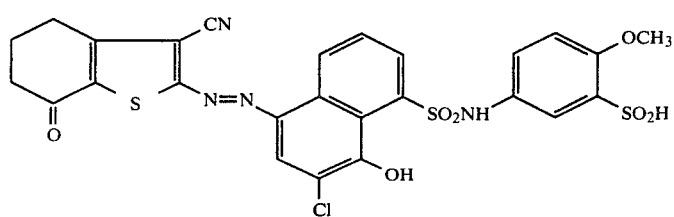
Dye 19
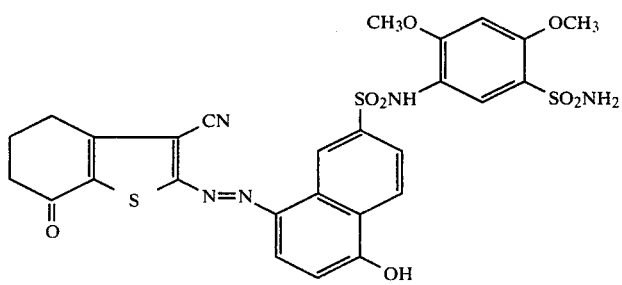
Dye 20
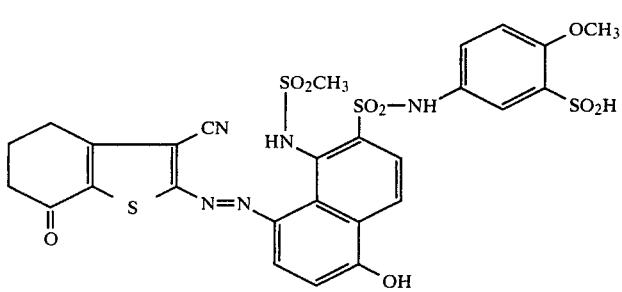
Dye 21
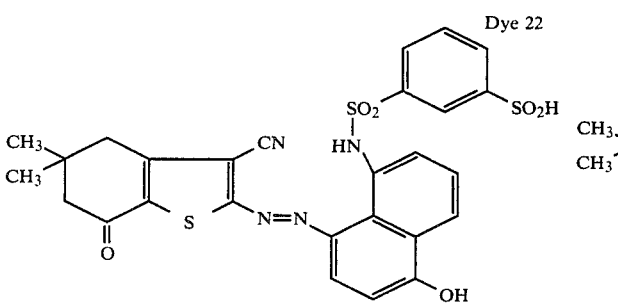
Dye 22
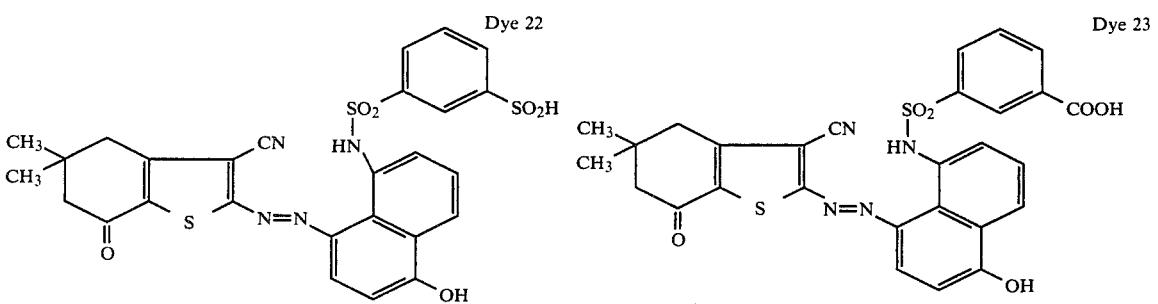
Dye 23
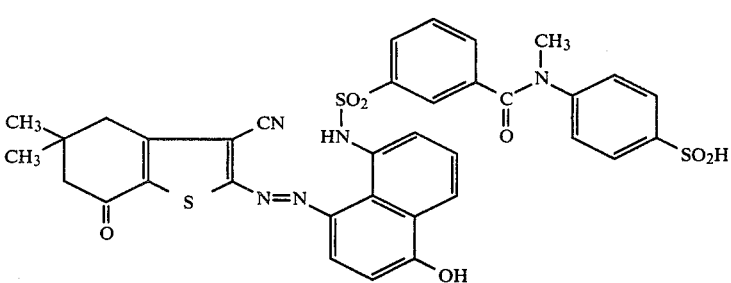
Dye 24
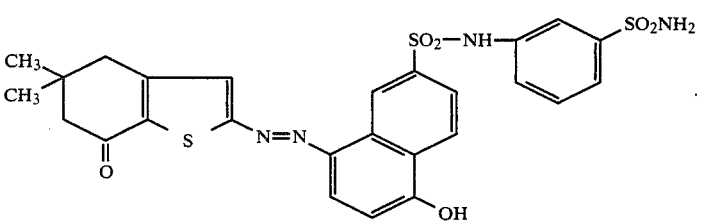
Dye 25

-continued
Dye 26
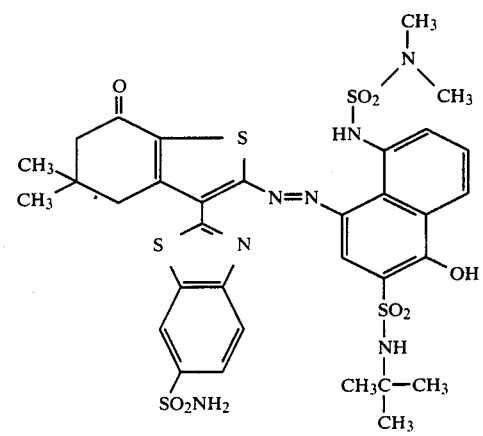
Dye 27
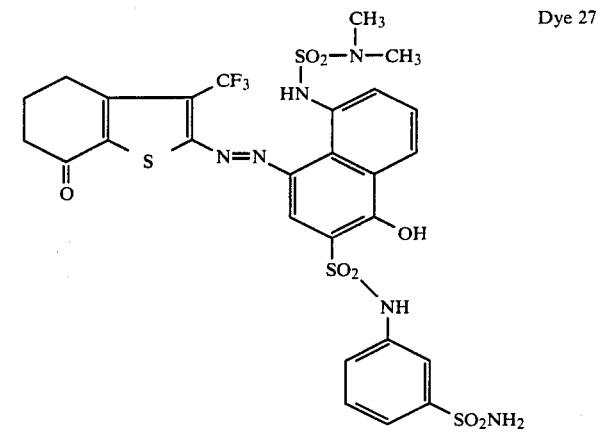
Dye 28*
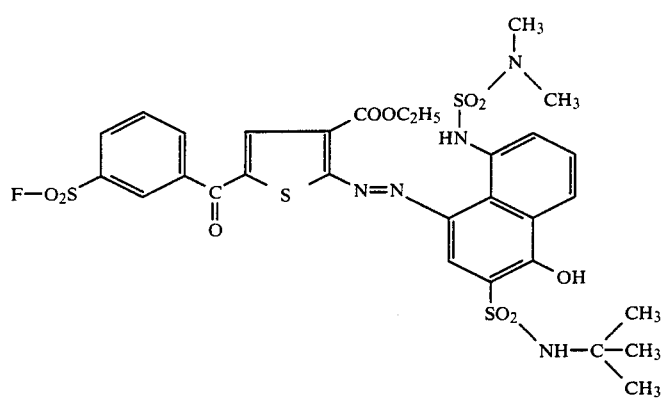
Dye 29
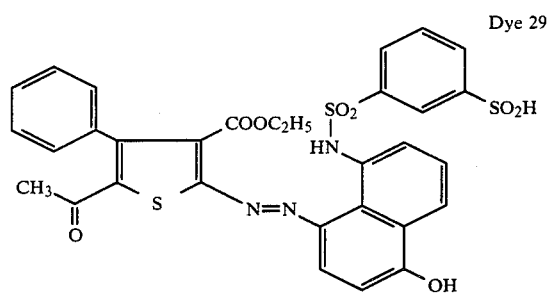
Dye 30
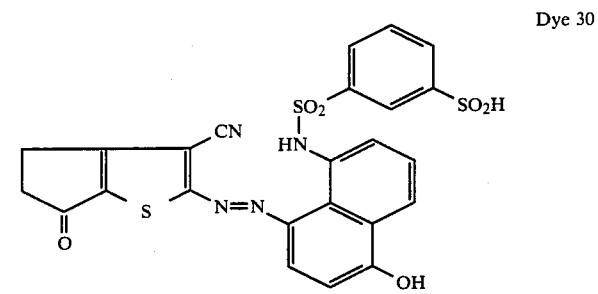
Dye 31
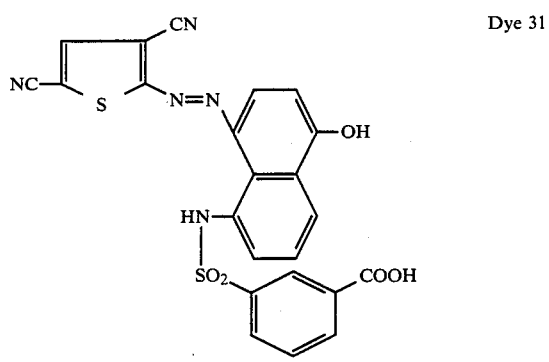
Dye 32
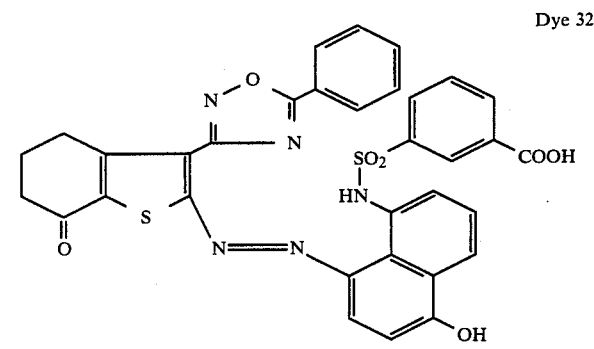

-continued

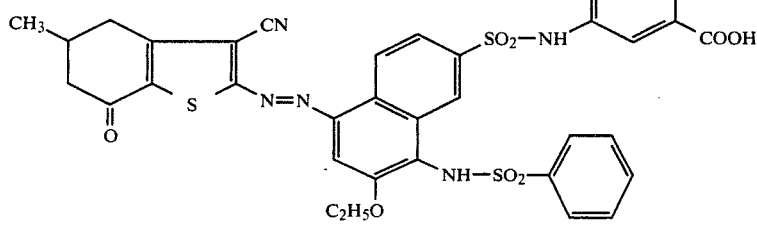
Dye 33

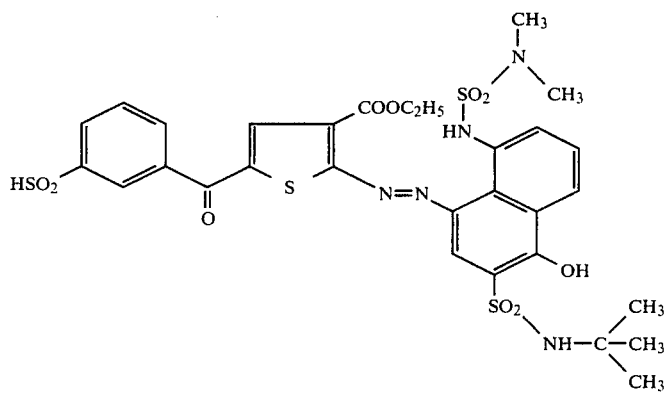
Dye 34

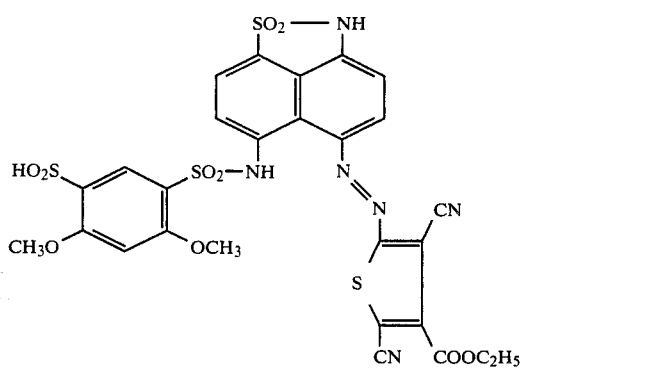
Dye 35

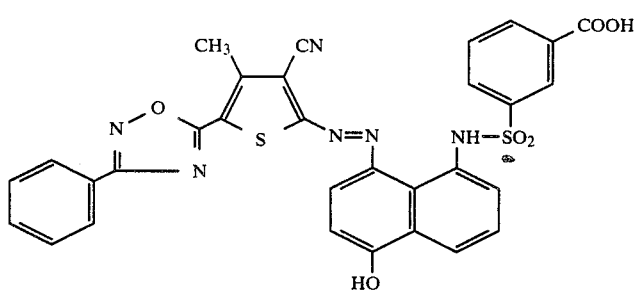
Dye 36*

The monoazo dyes of formula I used according to the invention are new. Some of them do not occur in an anionic cyan form at pH values below 5 to 6 or when they are not mordanted but in a red to violet neutral form.

It is precisely for their use in photographic recording materials based on the dye diffusion process that this behaviour is desirable since it has the effect that when the dye is incorporated in a layer, it has no strong absorption in the region to which an associated emulsion layer has been sensitized and it therefore has little undesirable filter action.

An additional reduction in the filter effect of the incorporated dye may be achieved in particular by blocking the auxochromic group G with an acyl function which is readily split off, in particular one of the protective groups described in European Patent Application EP-A-No. 0 009 989 which are split off by a ring closure mechanism.

The monoazo dyes according to the invention corresponding to formula I and the dye releasers of formula III are normally prepared in several stages, one of which deals with the formation of the link to the carrier group which confers diffusion resistance while another deals with the synthesis of the chromophore. The latter is normally carried out by azo coupling of the diazonium salt of a corresponding di-acceptor substituted 2-aminothiophene of formula IV with a naphthol, naphthosultam or sulphonamidonaphthalene corresponding to formula V.

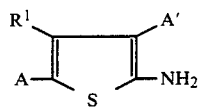

IV

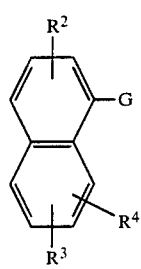

V

In formulae IV and V, A, A', $R^1$ to $R^4$ and G have the meanings already indicated. Some of the substituents may be present in a functionally modified form, i.e. in a form from which they can be converted into their ultimate form by known methods of preparation. Thus, for example, a group which will subsequently take the form of a sulphonamide or sulphinic acid function may be put into the process in the form of the corresponding sulphochloride or sulphofluoride.

The process is well known and widely described and requires no further explanation to the man of the art. Suitable instructions for diazotisation and azo coupling may be found, for example, in DE-A-No. 2 716 033.

A survey may be found in the article by Weaver and Shuttleworth, "Heterocyclic Diazo Components" in Dyes and Pigments 3 [1982], pages 98 to 102.

Methods for the synthesis of special acceptor substituted 2-aminothiophenes may be found, for example, in surveys given in articles by K. Gewald and S. Rajappa, see Chimia 34 101-110 (1980) and Heterocycles 7, 507 to 527 (1977). Useful information on the availability of compounds of formula IV by methods of preparation may be found in U.S. Pat. No. 4,346,161.

Other methods, however, may also be used for the preparation of the dyes, e.g. the reaction of a substituted 1,4-naphthoquinone with a dye acceptor substituted thienyl hydrazine, or the oxidative coupling of hydrazine with the naphthol. In these procedures, the hydrazine may be present in the form of a N-thienyl-N'-sulphonyl hydrazine.

According to one generally applicable method of preparing compounds corresponding to formula IV, compounds which in one of their tautomeric forms correspond to formula VI

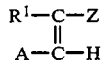

VI wherein
  $R^1$ and A have the meanings already indicated and
  Z represents a hydroxyl, ether or amino group are reacted with compounds corresponding to formula VII

A'—CH$_2$—CN   VII in the presence of elementary sulphur under the conditions of the Knoevenagel condensation.

Compounds corresponding to formula IV in which $R^1$ and A form a ring together with the two participating carbon atoms of the thiophene ring may advantageously be obtained by reacting compounds which correspond to formula VIII

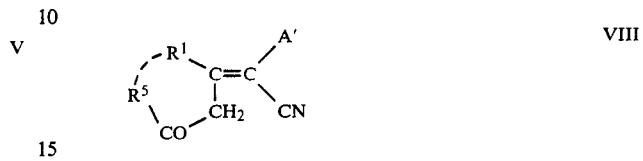

VIII in one of their tautomeric forms with elementary sulphur to undergo ring closure in a medium which is inert under the reaction conditions.

The compounds of formula VI to VIII are either known or readily prepared by known methods.

A survey of examples of suitable 2-aminothiophenes ("amine") corresponding to formula IV is given below.

The methods of procedure are described in detail in the German Patent Application P No. 33 44 294.0.

Amine 1

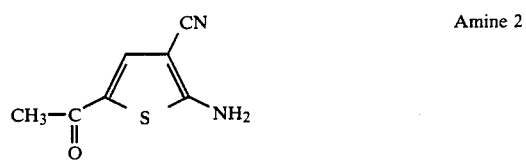

Amine 2

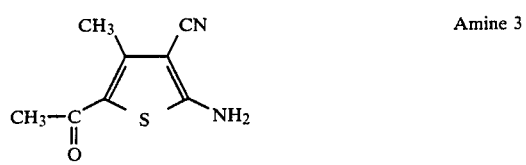

Amine 3

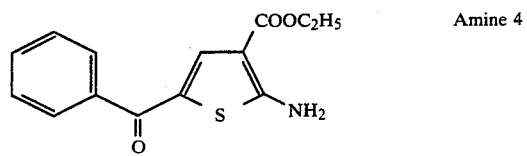

Amine 4

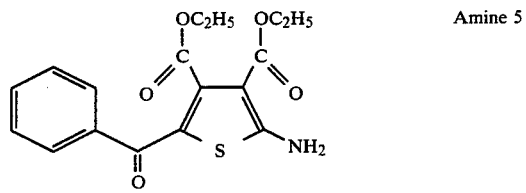

Amine 5

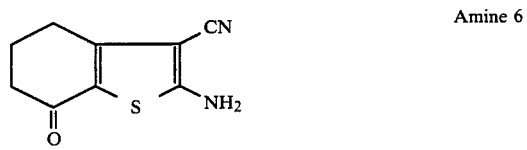

Amine 6

-continued

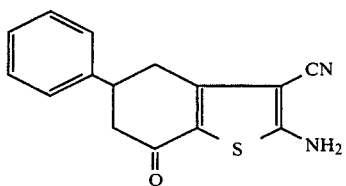
Amine 7

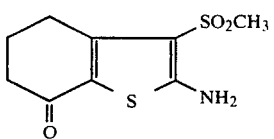
Amine 8

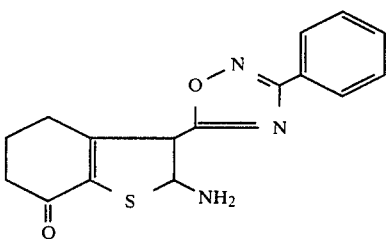
Amine 9

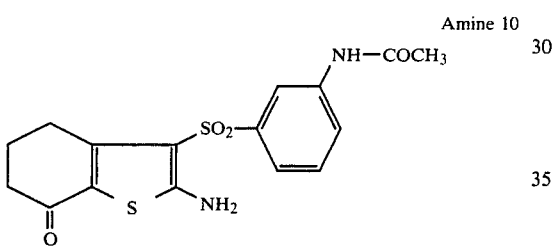
Amine 10

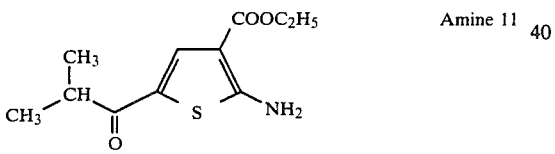
Amine 11

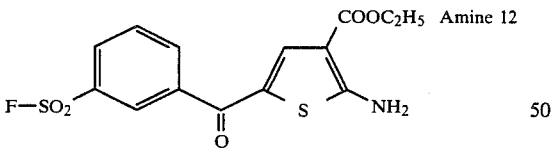
Amine 12

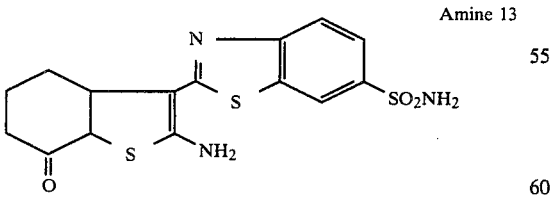
Amine 13

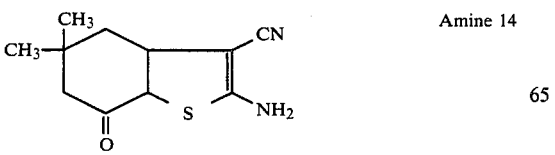
Amine 14

-continued

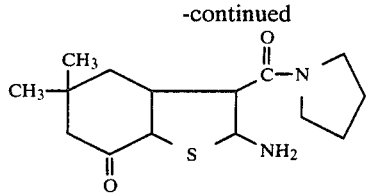
Amine 15

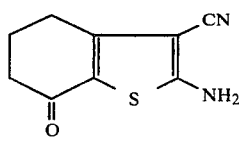
Amine 16

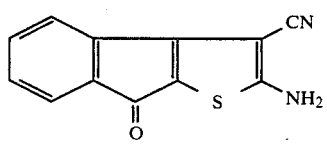
Amine 17

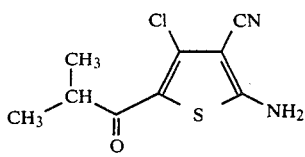
Amine 18

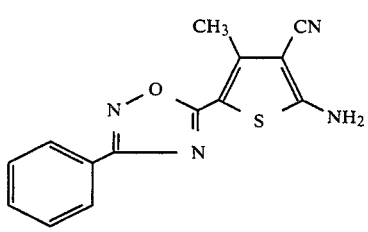
Amine 19

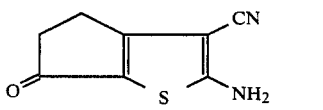
Amine 20

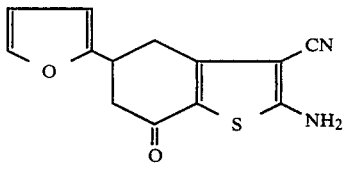
Amine 21

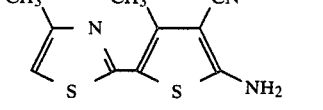
Amine 22

The compounds of formula V are based on known coupling components from the chemistry of 1-naphthols or 1-naphthylamines, which are converted into the coupling components proper by suitable reactions, e.g. via the sulphochlorides or carboxylic acid chlorides or by halogenation and/or Bucherer reactions.

The following are examples of compounds which may be used as starting materials for these syntheses:
1-Naphthol-sulphonic acid-2,
1-naphthol-sulphonic acid-3,
1-naphthol-sulphonic acid-6,
1-naphthylamine-sulphonic acid-6, from which 2-chloro-1-naphthol-sulphonic acid-6 may be obtained by chlorination in the course of a Bucherer synthesis,
1-naphthol-sulphonic acid-8,
1-naphthionic acid,
7-acetylamino-1-naphthol-3-sulphonic acid,
8-acetylamino-2-chloro-1-naphthol-5-sulphonic acid,
5-amino-1-naphthol-2-sulphonic acid,
5-aminonaphthol-1,
8-acetylamino-1-naphthol-2,5-disulphonic acid,
5-acetylamino-1-naphthol-3-sulphonic acid.

Where two sulpho groups are present, they may either be together converted into a disulphochloride in the course of the synthesis and form sulphonamides with equal or unequal sulphonamide portions or the reaction may be carried out stepwise.

The following are further examples of naphthols serving as suitable constituents for the synthesis of the corresponding dyes

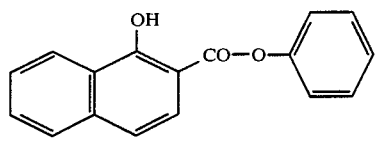

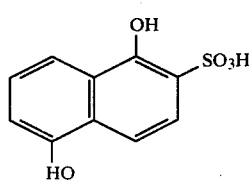

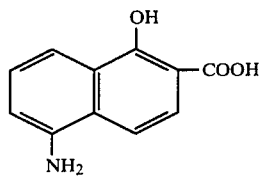

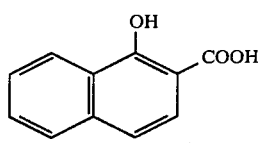

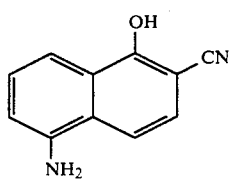

Groups provided for forming a link with the carrier group which confers diffusion resistance may be introduced by subsequent sulphination or by direct sulphochloride synthesis.

Reactions required for these steps are known and require no detailed explanation.

Dye releasers according to the invention corresponding to the general formula III are summarized below in a survey of examples.

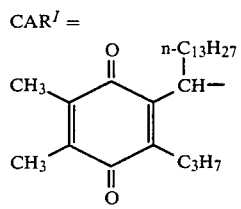

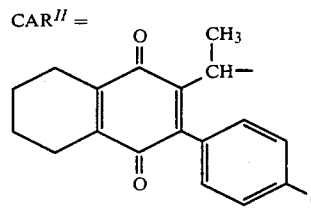

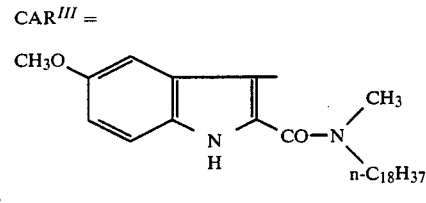

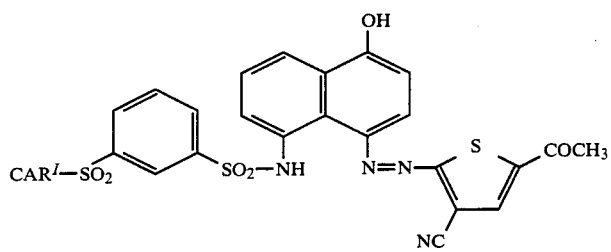

Dye releaser 1

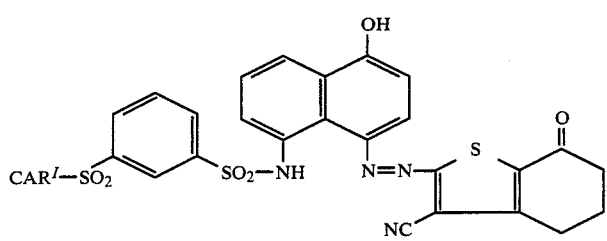

Dye releaser 2

-continued
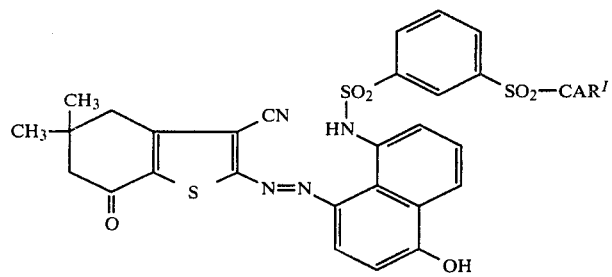
Dye releaser 3
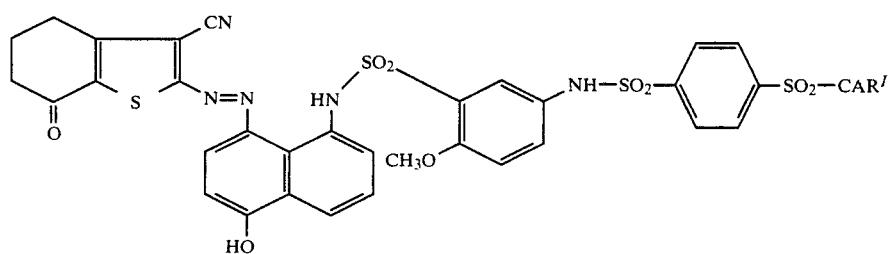
Dye releaser 4
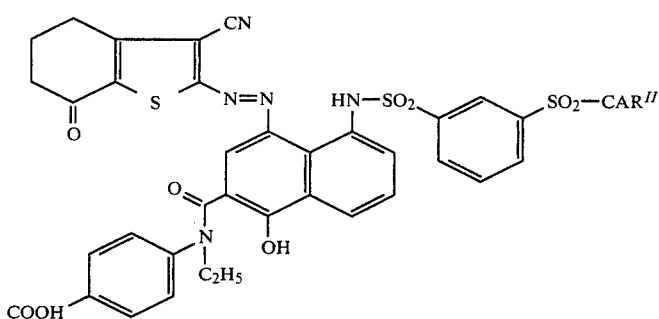
Dye releaser 5
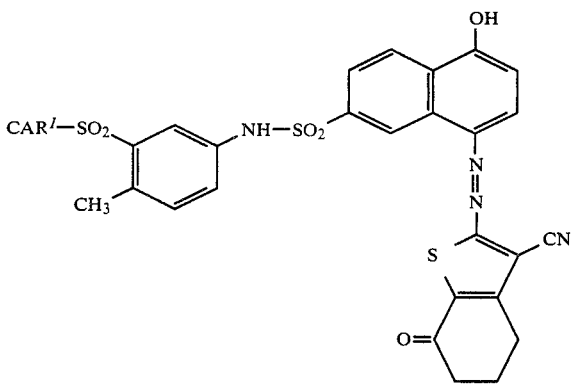
Dye releaser 6
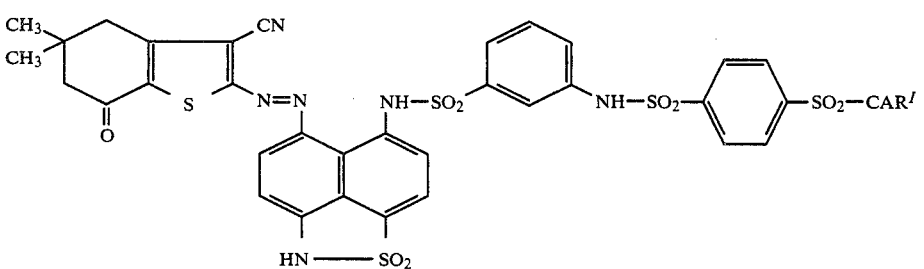
Dye releaser 7

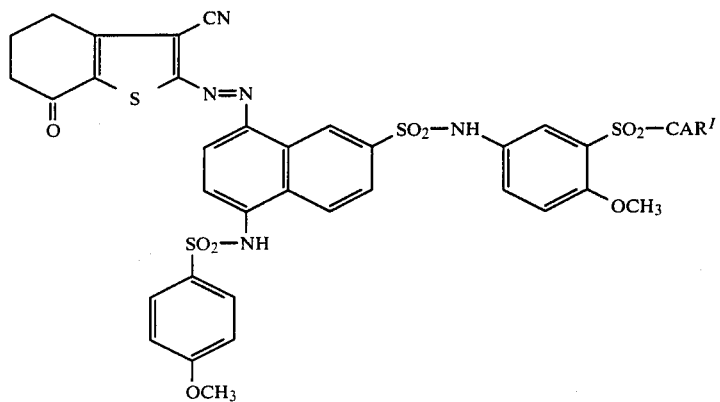
Dye releaser 8
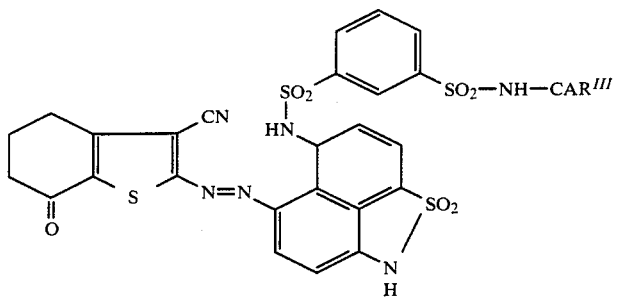
Dye releaser 9
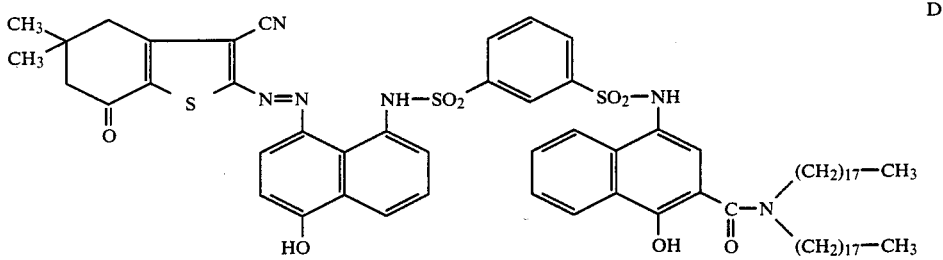
Dye releaser 10
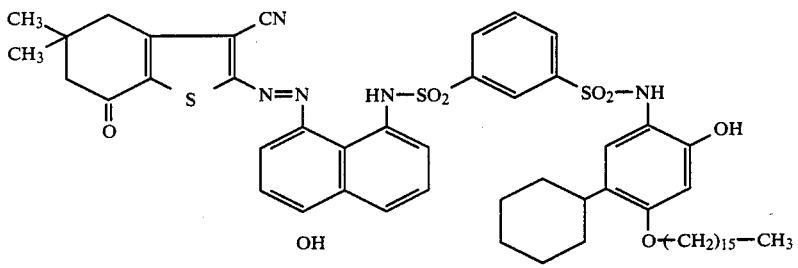
Dye releaser 11
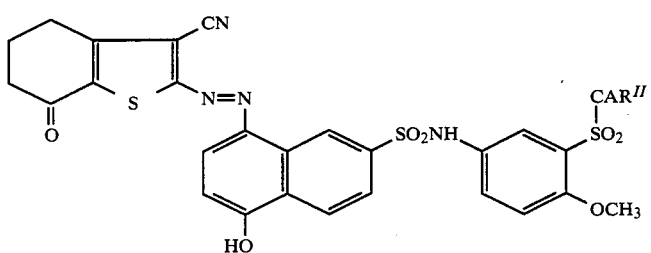
Dye releaser 12

-continued
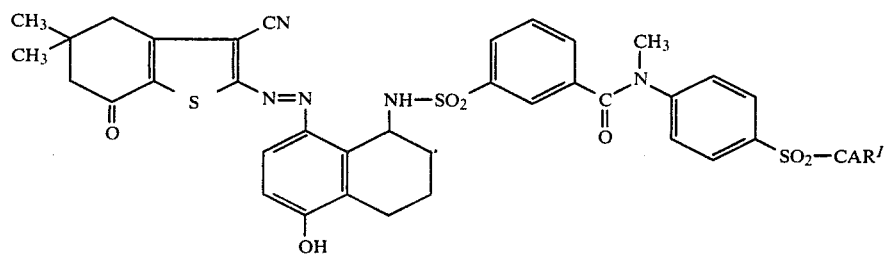
Dye releaser 13
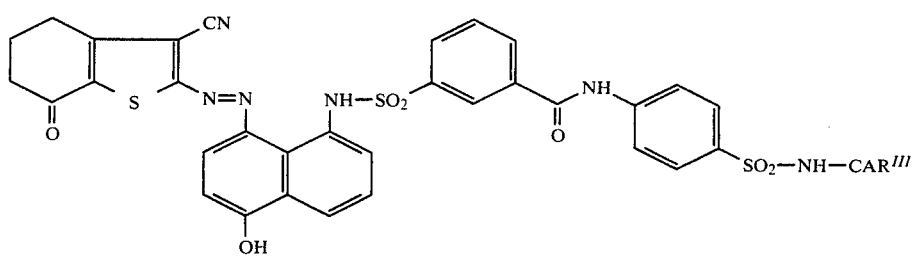
Dye releaser 14
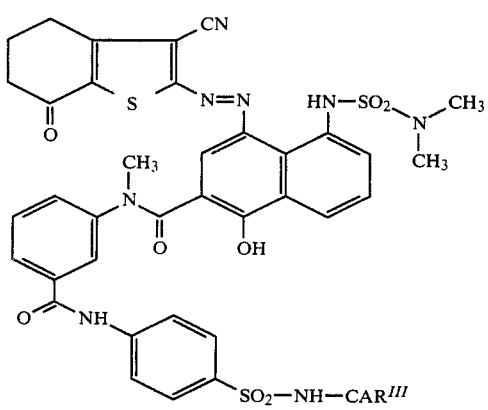
Dye releaser 15
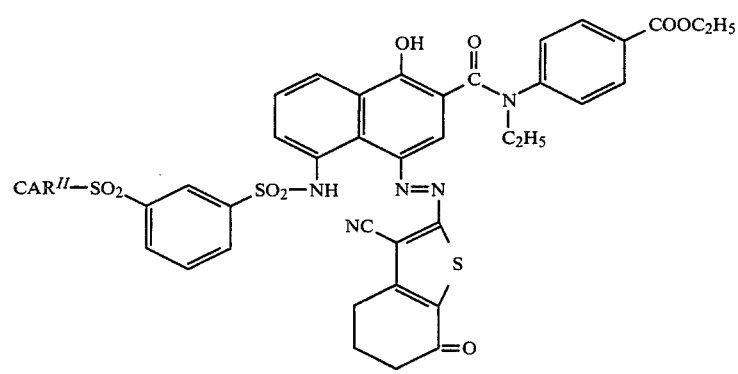
Dye releaser 16

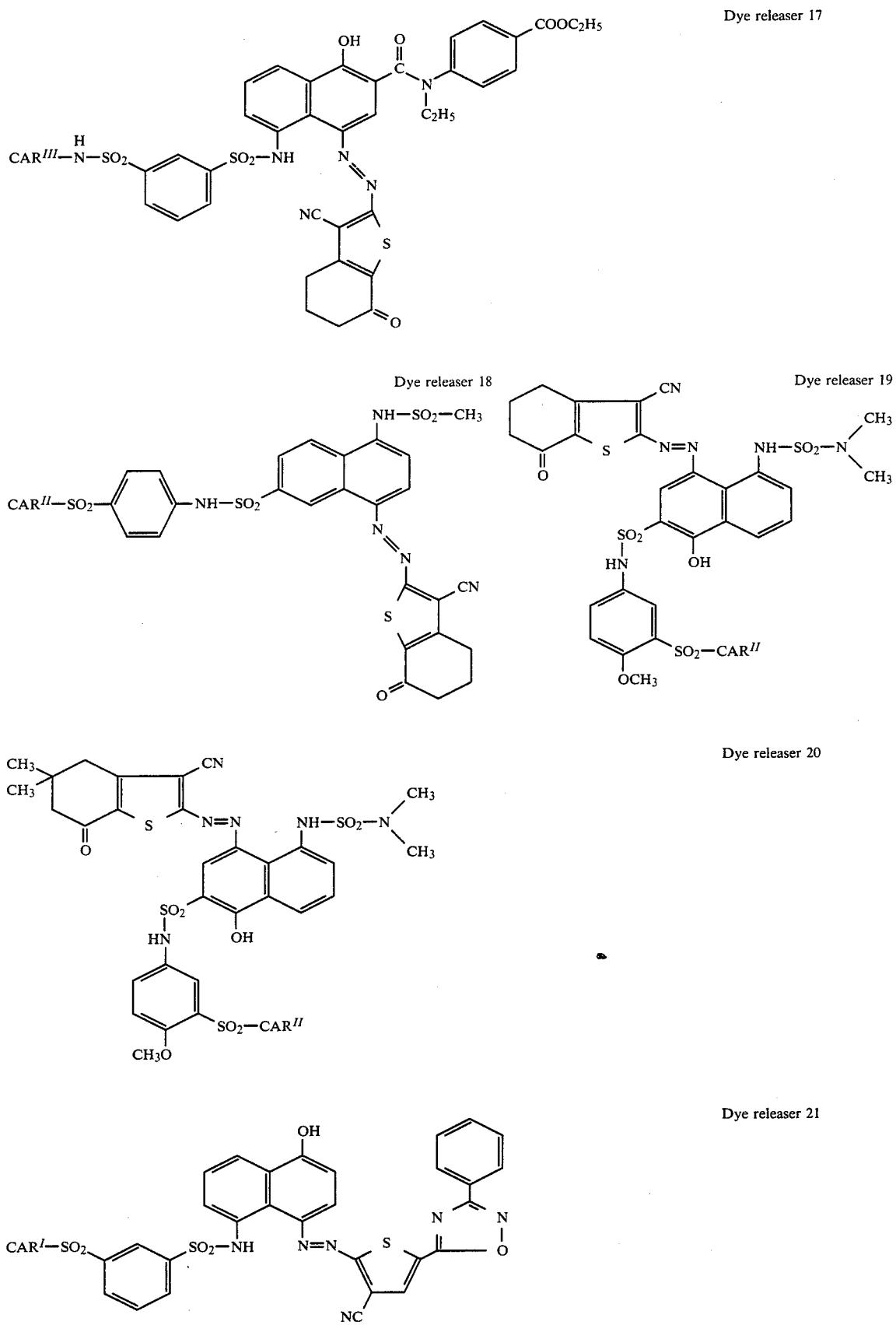

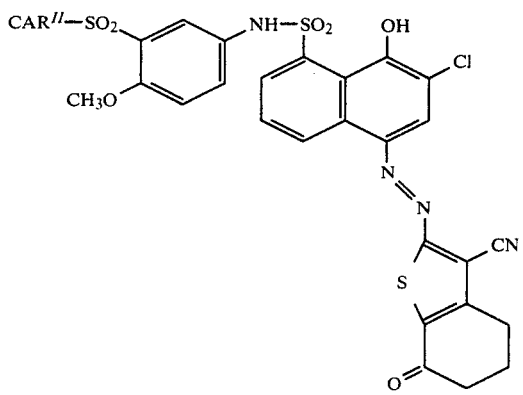

Dye releaser 22

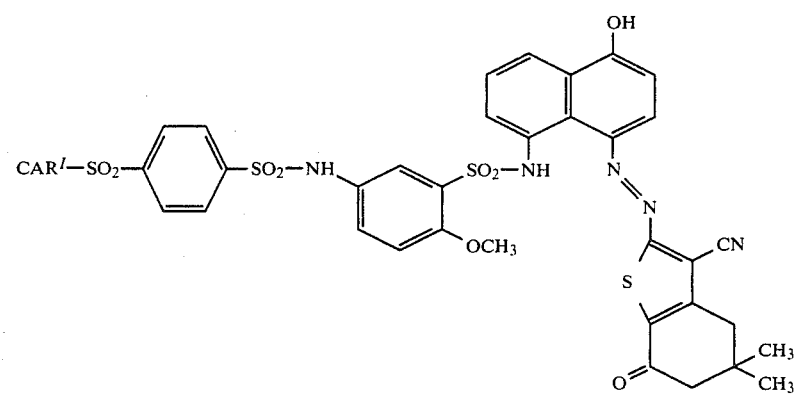

Dye releaser 23

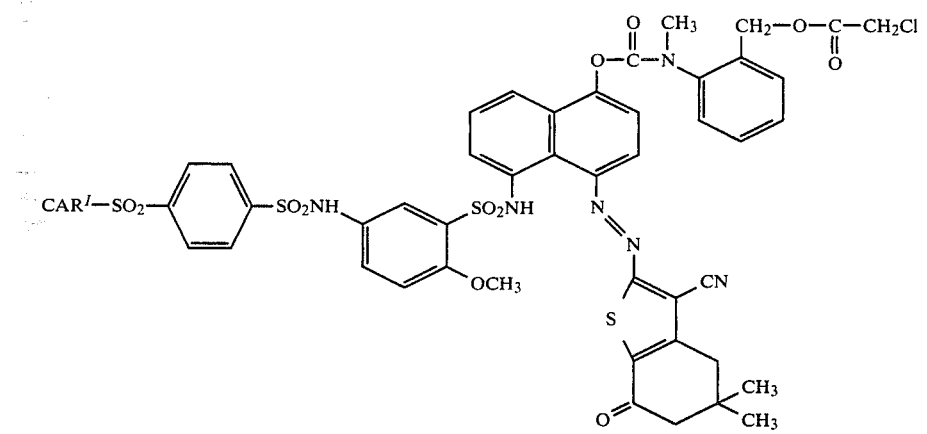

Dye releaser 24

EXAMPLES OF PREPARATION

Dye releaser 2

Preliminary stage 2.1

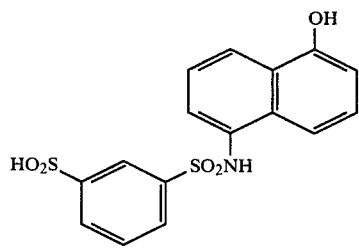

3-(5-Hydroxy-1-naphthylamido-sulphonyl)-benzene sulphinic acid 38.1 g of 5-(m-fluorosulphonyl)-benzenesulphonamido-1-naphthol (0.1 mol) in 400 ml of water and 15 ml of hydrazine hydrate are heated to 70° C. for 6 hours. The reaction mixture is then filtered after the addition of 20 g of active charcoal and cooled to 15° C., and 100 g of sodium chloride are added. The precipitated sodium salt is taken up in a small quantity of water and converted into the free acid by the addition of 10 ml of sulphuric acid and 10 ml of water. Yield: 19.9 g (55% of theoretical).

Preliminary stage 2.2

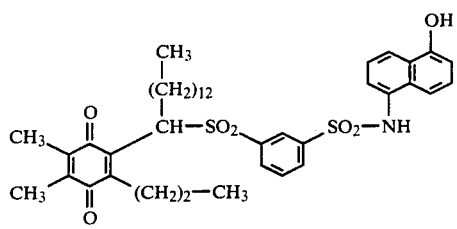

19.6 g (0.05 mol) of 2,3-dimethyl-5-propyl-6-(α-hydroxy)-tetradecylhydroquinone, the preparation of which is described on page 30 of DE-A-No. 2 854 946, and 18.2 g (0.055 mol) of Preliminary stage 2.1 are stirred together in 150 ml of acetic acid and 15 ml of water and heated to 70° C., and the mixture is maintained at 70° C. for 4 hours. After the addition of 30 g of iron-III chloride hexahydrate and a further 75 ml of acetic acid, the reaction mixture is heated to 50° C. for one hour and then cooled to 15° C. and stirred until crystallisation has been completed. The product is suction filtered, washed with 100 ml of acetic acid and 500 ml of water and dried in air. 29.5 g (80% of theoretical) of a yellow powder are obtained.

Preliminary stage 2.3

2-Amino-3-cyano-7-oxo-4,5,6,7-tetrahydrobenzothiophene (Amine 6)

16 Parts of (dicyanomethylene)-3-hydroxy-1-cyclohexene and 3.2 parts of sulphur are introduced into 80 parts of ethanol. After the addition of 20 parts of triethylamine, the reaction mixture is boiled under reflux for 2 hours. It is then evaporated to dryness in a rotary evaporator and the residue is stirred up with a mixture of 100 parts of water and 30 parts of sodium hydrogen sulphide solution. 10 Parts of amine 6 are obtained after isolation, washing and drying.

Dye releaser 2 (Diazotisation and azo coupling)

9.6 g (0.05 mol) of amine 6 are suspended in 96 ml of a mixture of acetic acid and propionic acid in proportions by volume of 1:1. 2 ml of 96% H$_2$SO$_4$ are added under conditions of cooling with ice and the amine is diazotised with 8.8 ml of 42% nitrosyl sulphuric acid at −5° C. Stirring is then continued for 3 hours at −5° C., 0.2 g of urea are added, and the diazo solution is introduced with stirring, at 0° C., into a solution of 36.8 g of Preliminary stage 2.2 in 370 ml of methanol to which 0.2 ml of 96% sulphuric acid have been added. The blue coloured suspension is cooled with ice and left under these conditions for 6 hours to complete the coupling reaction. It is then decanted to separate the smeary crude product which is then stirred up with ice water. After crystallisation has been completed, the reaction product is suction filtered, dried in air, taken up in 250 ml of dichloromethane and chromatographed with dichloromethane over 500 g of silica gel 60 (average particle size 63 μm) with the addition of increasing quantities of methanol. 15 g of a chromatographically uniform blue-black powder is obtained by concentrating the middle fractions by evaporation.

Dye releaser 3

The procedure is the same as for Dye releaser 2 except that the diazo component used is 2-amino-3-cyano-5,5-dimethyl-7-oxo-4,5,6,7-tetrahydrobenz[b]thiophene.

The method of preparation of the diazo component is described in the German Patent Application P No. 33 44 194.0.

Dye releaser 6

Preliminary stage 6.1

Na-1-acetoxynaphthalene-6-sulphonate 120 g (0.5 mol) of ammonium-1-naphthol-6-sulphonate and 41 g (0.5 mol) of sodium acetate in 600 g of acetic acid and 600 ml of acetic acid anhydride are kept under reflux for 2 hours, then suction filtered after cooling to 40° C., washed with ethyl acetate and dried. Yield: 142 g.

Preliminary stage 6.2

1-Acetoxynaphthalene-6-sulphochloride 50 g of phosphorus pentachloride are introduced into 69 g of Preliminary stage 6.1 at 60° C. and the reaction mixture is stirred for one hour at 60° C. The liquid mixture is then introduced into 500 g of ice and stirred until evolution of gas ceases. The product is extracted three times, each time with 200 ml of chloroform, and the chloroform phase is washed neutral, dehydrated with sodium sulphate and concentrated by evaporation.

Preliminary stage 6.3

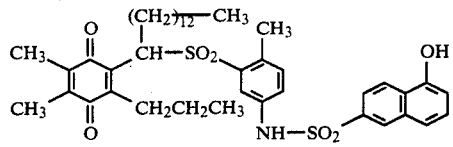

The starting amine (carrier amine) is prepared according to the instructions given in DE-A-No. 3 107 540, pages 45 to 46: 2,3-Dimethyl-5-propyl-6-[α-(2-methyl-5-aminophenyl)sulphonyl]-tetradecylbenzoquinone-1,4.

54.3 g (100 mmol) of the carrier amine in 500 ml of chloroform are introduced into the reaction vessel and 40 ml of pyridine are added. A solution of 28.8 g (115 mmol) of Preliminary stage 6.2 in 300 ml of chloroform is then introduced at 25° C. The reaction mixture is stirred for 2 hours at 20° to 25° C. and concentrated by evaporation. The residue is then stirred up with 500 ml of water. The crystallised residue is taken up in 650 ml of ethanol after removal of the water by suction filtration, and the residue in ethanol is kept under reflux for one hour with 100 ml of concentrated hydrochloric acid. The reaction mixture is then again concentrated by evaporation, stirred up several times with water, decanted and boiled up with methanol (300 ml). The product precipitates on cooling. Yield: 64 g (88% of theoretical).

Dye releaser 6

6.6 g (30 mmol) of amine 6 in
60 ml of orthophosphoric acid and
60 ml of a mixture of propionic acid/acetic acid 3:1 are diazotised at −10° C. with
6 ml of 40% nitrosyl sulphuric acid as described for Dye 8, and the diazonium solution, freed from excess nitric acid, is introduced dropwise at −10° to −5° C. into a solution, maintained at −10° C., of
21.7 g (30 mmol) of Preliminary stage 6.3 in a mixture of
200 ml of propionic acid,
200 ml of acetic acid and
50 ml of ethanol.

The reaction mixture is left to stand at −10° to 0° C. for 3 hours to complete the coupling reaction and poured out on 1000 g of ice. It is then stirred for 20 minutes, decanted and washed three times with 200 ml portions of ice water. The product, which solidifies at this stage, is suction filtered, dried in air for 24 hours and purified by column chromatography on 1000 g of silica gel Woelm (32–63 μm), using dichloromethane/methanol 98:2 as eluant.

12.4 g of chromatographically uniform substance is obtained from the eluate in the form of a dark red powder after evaporation.

When the dye releasers according to the invention are incorporated in a colour photographic recording material for th dye diffusion transfer process, they are placed in association with a light-sensitive silver halide emulsion layer. A photographic material of this kind used for a monochromatic process contains at least one light-sensitive silver halide emulsion layer whereas a material of this kind used for the production of multicoloured images generally contains at least three light-sensitive silver halide emulsion layers diffusing in their spectral sensitivity, and according to the invention, at least one of these layers has a dye releaser corresponding to the formula III associated with it. When development takes place, the dye releasers of the present invention give rise to diffusible cyan dyes which have excellent lightfastness, improved spectral properties and reduced sensitivity to reducing agents. They are therefore preferably associated with a red-sensitive silver halide emulsion layer.

By "association" and "associated" is meant that the light-sensitive silver halide emulsion layer and the dye releaser are so arranged in relation to each other that when development takes place, they are capable of interacting to release the diffusible azo dye as a function of the development of the silver halide emulsion layer.

The light-sensitive silver halide and the dye releaser need not necessarily be present in the same layer for this purpose but may be accommodated in adjacent layers, provided these belong to the same layer unit.

In cases where the dye releasers according to the invention are reducible compounds which are split by a process of reduction and which are advantageously used in combination with ED compounds (or their precursors, e.g. according to DE-A-No. 3 006 268), the term "association" means that the silver halide emulsion, the ED compound or ED precursor compound ans the dye releaser are so arranged in relation to each other that they are capable of interacting to produce an imagewise correspondence between the silver image formed and the consumption of ED compound on the one hand and between unused ED compound and the dye releaser on the other hand so that an imagewise distribution of diffusible dye is obtained in correspondence with the undeveloped silver halide.

Although various methods may be employed for incorporating the dye releasers according to the invention, it has been found advantageous to incorporate these compounds in the layers in the form of emulsions, using so-called oil formers. It is particularly when reducible dye releasers capable of being split up by reduction are used in combination with ED compounds that this method has the advantage that the dye releasers and the ED compounds may be brought into exceptionally close functional contact in the form of a common emulsion. Suitable oil formers have been described, for example, in U.S. Pat. No. 2,322,027, DE-A-No. 1 772 192, DE-A-No. 2 042 659 and DE-A-No. 2 049 689. The optimum quantities of dye releaser and, where indicated, ED compound to be incorporated may be determined by simple routine tests. The dye releaser according to the present invention may be used, for example, in quantities of from 0.05 to 0.2 mol, and the ED compound, if used, in quantities of from 0.1 to 0.6 mol per mol of silver halide.

Development of the colour photographic material according to the invention which has been exposed image-wise is started by a treatment with an aqueous alkaline, optionally highly viscous developer solution. The auxiliary developer compounds required for development are either present in the developer solution or may be partly or completely contained in one or more layers of the colour photographic recording material according to the invention. When development takes place, diffusible dyes are released imagewise from the dye releasers and transferred to an image receptor layer which may either be an integral constituent of the colour photographic material according to the invention or is in contact with this material at least during the time of development. The image receptor layer may therefore be arranged on the same layer support as the light-sensitive element or on a separate layer support. It consists substantially of a binder containing mordant for fixing the diffusible dyes released from the non-diffusible dye releasers. The mordants used for anionic dyes are preferably long chain quaternary ammonium or phosphonium compounds, e.g. those described in U.S. Pat. No. 3,271,147 and U.S. Pat. No. 3,271,148. Certain metal salts and their hydroxides which form sparingly soluble compounds with the acid dyes may also be used. Polymeric mordants are also suitable, such as those described in DE-A-No. 2 315 304, DE-A-No. 2 631 521 or DE-A-No. 2 941 818. The dye mordants are dispersed in one of the conventional hydrophilic binders in the layer of mordant, e.g. in gelatine, polyvinyl pyrrolidone or partially or completely hydrolysed cellulose esters: Certain binders may, of course, also function as mordants, e.g. polymers of nitrogen-containing, optionally quaternary bases, such as N-methyl-4-vinylpyridine, 4-vinylpyridine or 1-vinylimidazole, as described in U.S. Pat. No. 2,484,430. Other examples of suitable mordanting binders include guanyl hydrazone derivatives of alkyl vinyl ketone polymers as described, for example, in U.S. Pat. No. 2,882,156, and guanyl hydrazone derivatives of acyl styrene polymers, as described, for example, in DE-A-No. 2 009 498, but the last mentioned mordanting binder would generally only be used together with other binders, e.g. gelatine.

If the image receptor layer is to be left in contact with the light-sensitive element after development with the layers in contact has been completed, an alkali permeable, light-reflective layer of binder containing pigment is generally placed between the layers in contact, both to provide an optical separation between the negative and the positive and to form an aesthetically pleasing background for the colour image transferred. Such a light-reflective layer may in known manner already be preformed in the light-sensitive colour photographic material or it may be produced in the course of development, as is also known. If the image receptor layer is arranged between the layer support and the light-sensitive element and is separated from the latter by a preformed light-reflective layer, the layer support must either be transparent so that the transferred colour image produced can be viewed through the support or the light-sensitive element must be removed from the image receptor layer together with the light-reflective layer to expose the image receptor layer. The image receptor layer may, however, be arranged as the uppermost layer in an integral colour photographic recording material, in which case exposure is advantageously carried out through the transparent layer support.

After processing, the image receptor layer contains an imagewise distribution of cyan monoazo dyes corresponding to formula I. The dye releaser of formula III associated with the originally light-sensitive silver halide emulsion layer is also present in an imagewise distribution complementary to the transferred dye image after processing and may be utilised as colour image in known manner (retained image).

EXAMPLE 1

Image receptor sheet 1

The following layers were applied to a paper support which was coated with polyethylene on both sides and had been covered with an adhesive layer. The figures given relate to 1 m².

1. A mordant layer containing 6 g of mordant A and 5 g of gelatine,
2. a hardening layer containing 0.1 g of gelatine and 0.15 g of hardener H.

One strip of each of the image receptor materials obtained was dipped into a 0.025 molar dye solution made alkaline with 2% sodium hydroxide, and each strip was coloured to a density of 1.2–1.5 (determined on a reflection densitometer RD 514/Macbeth behind a red filter).

The following dyes were used: Dyes 1,2, 3, 4, 12, 13, 17, 23, 25, 31 (according to the invention) and, for comparison, dye B which was not according to the invention.

After the immersion treatment, the samples were rinsed with demineralised water and dried.

The results of the spectral measurements are summarized in Table 1 below.

The data show that the dyes according to the invention are superior to the comparable known art dye in their spectral data.

In particular, the side densities behind the green filter, determined on a Macbeth reflection densitometer RD-514, are significantly lower than those of dye B. Due to elimination of the magenta portion, the dyes as a whole give a greener effect.

The last column contains the percentage colour density changes on exposure to Xenon light 4.8.10⁶ lux.h.

In the last column but one, values measured above 720 nm have been omitted on account of unreliability of the apparatus in this range.

TABLE 1

| Dye | Side densities behind Blue filter [%] | Green filter [%] | $\lambda_{max}$ [nm] | Half band width [nm]* | $\frac{\Delta D}{D_o}$ |
| --- | --- | --- | --- | --- | --- |
| B | 17 | 30 | 640 | 565–685 | −93% |
| 1 | 20 | 26 | | | |
| 2 | 19 | 24 | 660 | 566– | −86% |
| 3 | 18 | 28 | 665 | 560– | −81% |
| 4 | 13 | 23 | 644 | 568–720 | −89% |
| 12 | 16 | 38 | 640 | 550–706 | −68% |
| 13 | 15 | 30 | 645 | 560– | −64% |
| 17 | 15 | 25 | 650 | 560–710 | −81% |
| 23 | 16 | 26 | 648 | 572–720 | −91% |
| 25 | 16 | 24 | 650 | 562–710 | −95% |
| 31 | 19 | 35 | 638 | 550– | −96% |

EXAMPLE 2

Example 1 is repeated but using

Image receptor sheet 2

1. Mordant layer containing
   4 g of a polyvinyl imidazole 10 mol-% of which has been quaternised with chloroethanol (see Research Disclosure No. 22 040),
   5 g of gelatine and
   0.02 g of saponin,
2. hardening layer as in Example 1.

The following dyes were used: Dye B (not according to the invention) Dyes 1, 2, 3, 4, 12, 17, 23, 25, 31 (according to the invention.

The tests were carried out by the method described in Example 1.

TABLE 2

| Dye | Side densities behind Blue filter [%] | Green filter [%] | $\lambda_{max}$ [nm] | Half band width [nm] | $\frac{\Delta D}{D_o}$ |
| --- | --- | --- | --- | --- | --- |
| B | 18 | 30 | 645 | 567–688 | −20% |
| 1 | 18 | 28 | 660 | 560–700 | −20% |
| 2 | 19 | 24 | 665 | 566– | −28% |
| 3 | 18 | 28 | 655 | 565– | −22% |
| 4 | 13 | 22 | 640 | 562–718 | −22% |
| 12 | 14 | 28 | 664 | 560–712 | −10% |
| 17 | 17 | 26 | 668 | 556–712 | −16% |
| 23 | 17 | 27 | 644 | 570–716 | −24% |
| 25 | 16 | 25 | — | — | −38% |
| 31 | 18 | 37 | — | — | −32% |

The results obtained in Example 2 show that in the case of image receptor layer 2, which from the start has better lightfastness characteristics, the lightfastness values obtained are generally equivalent but in some cases improved if the acyl thienyl azonaphthols according to the invention are used instead of the cyan dyes known in the art (Dye B).

EXAMPLE 3

A light-sensitive element of a photographic recording material was prepared by applying the following layers in succession to a transparent polyethylene terephthalate support. The quantities given are based in each case on 1 m².

Material I (not according to the invention)

1. Blue sensitized layer containing a silver chloroiodobromide emulsion (silver application 0.5 g Ag), 1.4 g of gelatine, 0.3 g of Dye releaser C (yellow) and 0.25 g of ED compound F,
2. intermediate layer of 0.8 g of Colanyl Yellow HR dispersion (Hoechst), 0.1 g of ED compound F and 0.8 g of gelatine,
3. green-sensitized layer containing 0.36 g of a silver chloroiodobromide emulsion (silver application 0.36 g Ag), 0.92 g of gelatine, 0.18 g of Dye releaser D (magenta) and 0.14 g of ED compound F,
4. intermediate layer of 0.6 g of Developer compound G, 0.1 g of ED compound F and 1.36 G of gelatine,
5. red sensitized layer containing a silver chloroiodobromide emulsion (silver application 0.33 g Ag), 1.0 g of gelatine, 0.23 g of Dye releaser E (cyan) and 0.11 g of ED compound F,
6. intermediate layer of 0.05 g of developer compound G and 0.39 g of gelatine,
7. white pigment layer of 16.0 g of $TiO_2$ and 2.3 g of gelatine,
8. intermediate layer of 0.2 g of diisooctylhydroquinone and 4.0 g of gelatine,
9. mordant layer containing 4.5 g of a polyvinyl imidazole of which 20 mol-% have been quaternized with chloroethanol, and 5.2 g of gelatine,
10. hardening layer containing 1.2 g of hardener H and 0.6 g of gelatine.

Materials according to the invention differing from material I in that the red-sensitized layer (layer 5) contained one of the dye releasers of the present invention indicated below instead of dye releasing compound E were prepared by the same method:

Material II—0.23 g of dye releaser 2
Material III—0.20 g of dye releaser 3
Material I—0.27 g of dye releaser 4
Material V—0.28 g of dye releaser 23
Material VI—0.22 g of dye releaser 6.

The following activators were used for development:
Potassium hydroxide—40 g
potassium bromide—3 g
2,2-methylpropyl-1,3-propanediol—25 g
1,4-cyclohexane dimethanol (50%)—20 g
Water—912 g.

The materials were exposed behind a grey wedge, developed for 2 minutes in the activator indicated, washed for 5 minutes and dried. The $D_{min}$ and $D_{max}$ values, the lightfastness (Xeno test apparatus $7.2 \cdot 10^6$ lux h) and dark fading (100 h storage at 35° C. and 90% relative humidity) were determined on the processed materials by measurements behind a red filter (Table 3).

TABLE 3

| Material | $D_{max}$ | $D_{min}$ | Side densities behind Blue filter [%] | Side densities behind Green filter [%] | $\frac{\Delta D}{D_o}$ (7.2·10$^6$ lx·h) at D = 0.6 | Lightfastness at D = 1.2 | $\lambda_{max}$ [nm] | Dark fading $\frac{D}{D_o}$ (100 n; 35° C.; 90% r.h.) |
|---|---|---|---|---|---|---|---|---|
| I | 1.96 | 0.12 | 25 | 41 | −14% | −12% | 640 | −15% |
| II | 1.61 | 0.13 | 22 | 39 | | | 644 | |
| III | 2.04 | 0.12 | 23 | 38 | −5% | −9% | 648 | ±0 |
| IV | 1.90 | 0.13 | 18 | 33 | | | 648 | |
| V | 2.26 | 0.12 | 18 | 33 | −6% | −8% | 650 | ±0 |
| VI | 2.32 | 0.15 | 22 | 38 | | | 644 | |

Table 3 shows that when the dye releasing compounds according to the invention are used, the lightfastness is improved and dark fading in the tropical cupboard is completely prevented. Testing the filter exposures behind blue, green and red filters shows that the reproduction of green areas are markedly improved when using the dyes according to the invention without any diminution of the blue areas.

The exact shade of colour transferred from the cyan colour separation shows a marked reduction in side densities in the case of dye releasing compound 3 according to the invention, measured behind blue and green filters.

Annexe of formulae

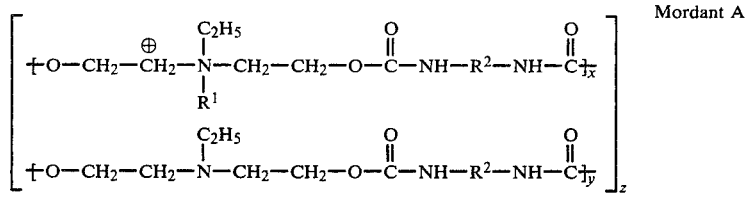

Mordant A z  50%  $C_2H_5-O-SO_3^\ominus$
   50%  $Cl^\ominus$
x  90%
y  10%
$R^1$  50%  $-C_2H_5$

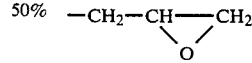

-continued
Annexe of formulae
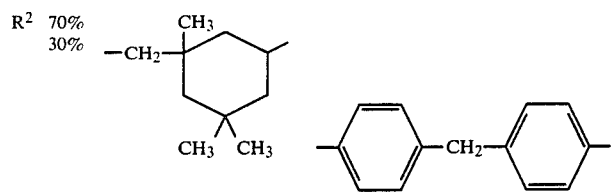
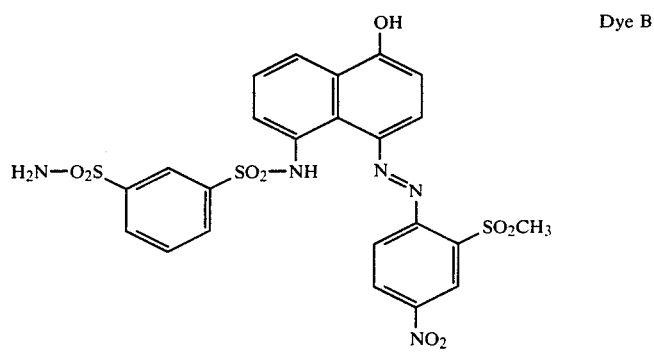
Dye B
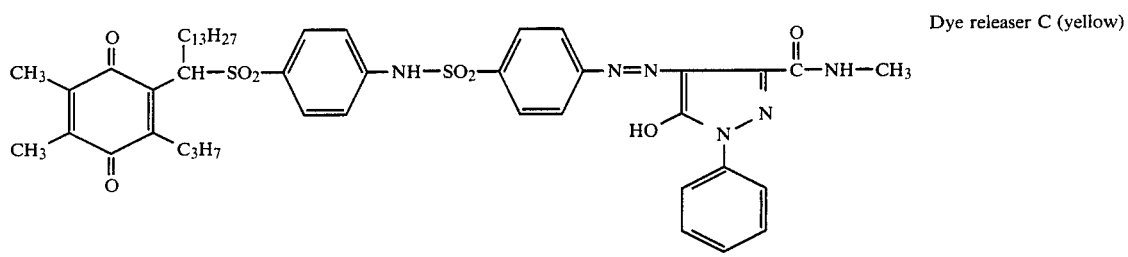
Dye releaser C (yellow)
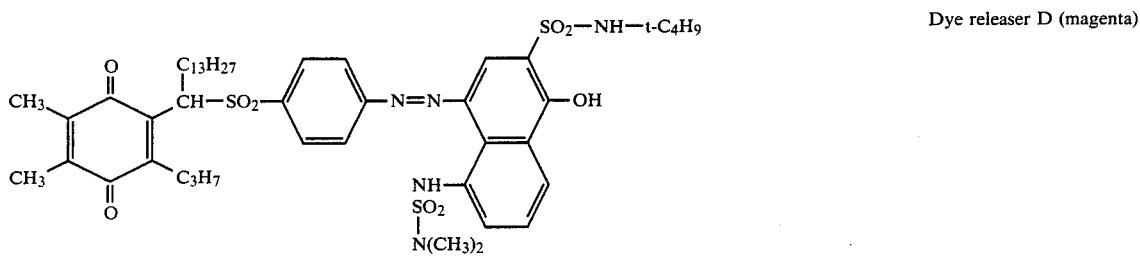
Dye releaser D (magenta)
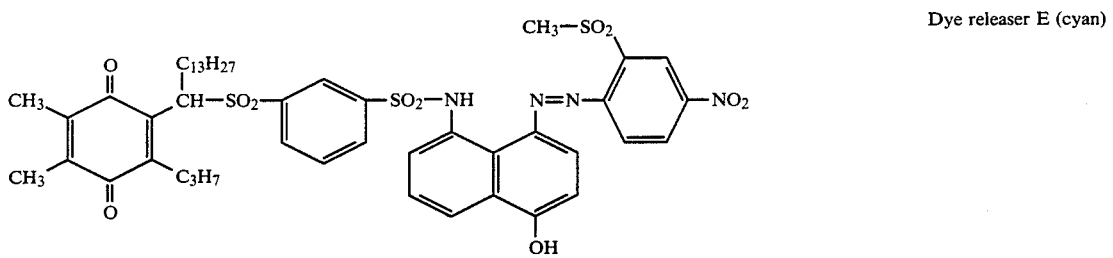
Dye releaser E (cyan)
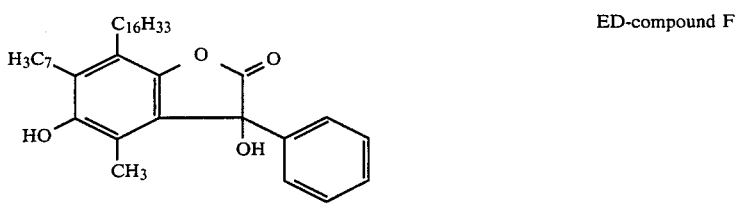
ED-compound F -continued
Annexe of formulae Developer compound G

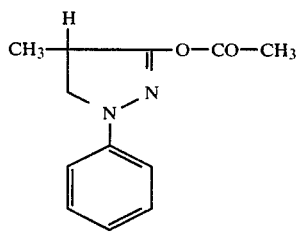

Hardener H

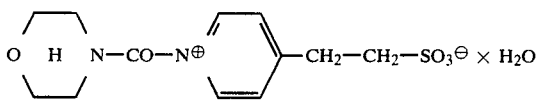

We claim:

1. A color photographic recording material for the production of color images by the dye diffusion transfer process, comprising at least one supported light-sensitive silver halide emulsion layer and associated thereto at least one non-diffusing color providing compound (dye releaser) from which a diffusible azo dye is released as a function of the development of the silver halide emulsion layer under the conditions of alkaline development, wherein the improvement comprises the azo dye released from the dye releaser corresponds to the following formula I:

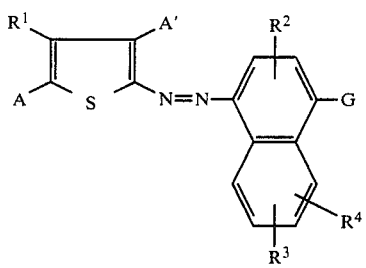

wherein

A represents $-CO-R^5$, $-CN$ or

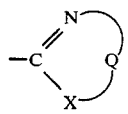

A' represents a group as defined for A, or $-CF_3$, $-CO-OR^6$, $-CO-NR^6-R^7$ or $-SO_2-R^8$, G represents $-OH$ or $-NH-SO_2-R^9$, Q represents a group which together with N, C and X forms a heterocyclic ring having an electron acceptor character, X represents $-O-$, $-S-$ or $-NR^{10}$, $R^1$ represents H, halogen, alkyl, aralkyl, aryl, $-CO-OR^6$ or a group which, together with A or A' and the two participating carbon atoms of the thiophene ring, forms a 5- to 7-membered ring, $R^2$ represents H or a group with electron acceptor character arranged in the ortho-position to G, $R^3$ represents H, acylamino or a group G' which conforms to the definition given for G but cannot form a naphthosultam structure, $R^4$ represents H, $-SO_2-NR^6-R^7$ or a bond in the periposition to the naphthalene ring forming, together with G and the three participating carbon atoms of the naphthalene ring, a naphthosultam structure, $R^5$ represents alkyl, aralkyl, aryl, thienyl or a group which together with $R^1$, the carbonyl group and the two participating carbon atoms of the thiophene ring, forms a 5- to 7-membered ring, $R^6$ represents H, alkyl, aralkyl or a group which, together with $R^7$ and the nitrogen atom, forms the residue of a cyclic amino group, $R^7$ represents H. alkyl. aralkyl, aryl or a group which, together with $R^6$ and the nitrogen atom, forms the residue of a cyclic amino group, $R^8$ represents H, alkyl, aralkyl or aryl, $R^9$ represents alkyl, aralkyl, aryl, $-NR^6-R^7$ or a linkage to the peri-position of the naphthalene ring, forming, together with the sulphonamide group and the three participating carbon atoms of the naphthalene ring, a naphthosultam structure, and $R^{10}$ represents H or alkyl.

2. The recording material as claimed in claim 1, wherein in formula I, A' represents $-CN$.

3. The recording material as claimed in claim 1, wherein the azo dye corresponds to the following formula:

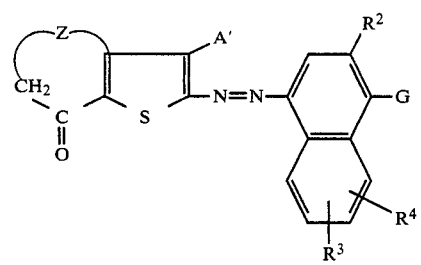

wherein

A' represents $-CN$, $-CF_3$ or

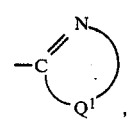

G represents $-OH$ or $-NH-SO_2R^9$, $Q^1$ represents a group which, together with N and C, forms the heterocyclic ring of a benzoxazole, benzothiazole, benzimidazole, oxadiazole or thiadiazole group, Z represents an optionally substituted methylene or ethylene group, $R^2$ represents H, Cl, —CN or —SO$_2$—NR$^6$—R$^7$, $R^3$ represents H, acylamino, —OH or —NH—SO$_2$—R$^{9'}$, $R^4$ represents H, —SO$_2$—NR$^6$—R$^7$ or a bond in the periposition to the naphthalene ring, forming, together with G and the three participating carbon atoms of the naphthalene ring, a naphthosultam structure, $R^6$ represents H, alkyl, aralkyl or a group which together with $R^7$ and the nitrogen atom forms the residue of a cyclic amino group, $R^7$ represents H, alkyl, aralkyl, aryl or a group which, together with $R^6$ and the nitrogen atom, forms the residue of a cyclic amino group, $R^9$ represents alkyl, aralkyl, aryl, —NR$^6$—R$^7$ or a linkage to the peri-position of the naphthalene ring forming, together with the sulphonamide group and the three participating carbon atoms of the naphthalene ring, a naphthosulpham structure, and $R^{9'}$ represents alkyl, aralkyl, aryl or —NR$^6$—R$^7$.

4. In the method of producing a cyan image by dye diffusion transfer processing of an imagewise-exposed color photographic recording material containing associated with at least one supported light-sensitive silver halide emulsion layer, at least one non-diffusing color providing compound, the method comprising the step of releasing from said non-diffusing color providing compound under conditions of alkaline development a diffusible azo dye corresponding to the following formula

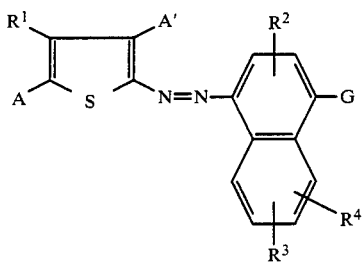

I wherein

A represents —CO—R$^5$, —CN or

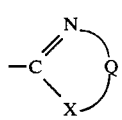

A' represents a group as defined for A, or —CF$_3$, —CO—OR$^6$, —CO—NR$^6$—R$^7$ or —SO$_2$—R$^8$, G represents —OH or —NH—SO$_2$—R$^9$, Q represents a group which together with N, C and X forms a heterocyclic ring having an electron acceptor character, X represents —O—, —S— or —NR$^{10}$, $R^1$ represents H, halogen, alkyl, aralkyl, aryl, —CO—OR$^6$ or a group which, together with A or A' and the two participating carbon atoms of the thiophene ring, forms a 5- to 7-membered ring, $R^2$ represents H or a group with electron acceptor character arranged in the ortho-position to G, $R^3$ represents H, acylamino or a group G' which conforms to the definition given for G but cannot form a naphthosultam structure, $R^4$ represents H, —SO$_2$—NR$^6$—R$^7$ or a bond in the periposition to the naphthalene ring forming, together with G and the three participating carbon atoms of the naphthalene ring, a naphthosultam structure, $R^5$ represents alkyl, aralkyl, aryl, thienyl or a group which together with $R^1$, the carbonyl group and the two participating carbon atoms of the thiophene ring, forms a 5- to 7-membered ring, $R^6$ represents H, alkyl, aralkyl or a group which, together with $R^7$ and the nitrogen atom, forms the residue of a cyclic amino group, $R^7$ represents H, alkyl, aralkyl, aryl or a group which, together with $R^6$ and the nitrogen atom, forms the residue of a cyclic amino group, $R^8$ represents H, alkyl, aralkyl or aryl, $R^9$ represents alkyl, aralkyl, aryl, —NR$^6$—R$^7$ or a linkage to the peri-position of the naphthalene ring, forming, together with the sulphonamide group and the three participating carbon atoms of the naphthalene ring, a naphthosultam structure, and $R^{10}$ represents H or alkyl wherein said processing is while the diffusible azo dye is transferrable to an image receptor layer.

5. The method as claimed in claim 4 wherein in the structural formula A' represents —CN.

6. The method as claimed in claim 4, wherein the monoazo dye corresponds to the following formula:

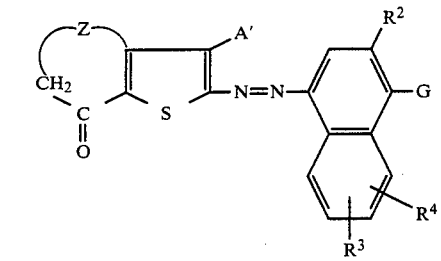

wherein

A' represents —CN, —CF$_3$ or

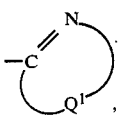

G represents —OH or —NH—SO$_2$R$^9$, $Q^1$ represents a group which, together with N and C, forms the heterocyclic ring of a benzoxazole, benzothiazole, benzimidazole, oxadiazole or thiadiazole group, Z represents an optionally substituted methylene or ethylene group, $R^2$ represents H, Cl, —CN or —SO$_2$—NR$^6$—R$^7$, $R^3$ represents H, acylamino, —OH or —NH—SO$_2$—R$^{9'}$, $R^4$ represents H, —SO$_2$—NR$^6$—R$^7$ or a bond in the periposition to the naphthalene ring, forming, together with G and the three participating carbon atoms of the naphthalene ring, a naphthosultam structure, $R^6$ represents H, alkyl, aralkyl or a group which together with $R^7$ and the nitrogen atom forms the residue of a cyclic amino group, $R^7$ represents H, alkyl, aralkyl, aryl or a group which, together with $R^6$ and the nitrogen atom, forms the residue of a cyclic amino group, $R^9$ represents alkyl, aralkyl, aryl, $-NR^6-R^7$ or a linkage to the peri-position of the naphthalene ring forming, together with the sulphonamide group and the three participating carbon atoms of the naphthalene ring, a naphthosulpham structure, and $R^{9'}$ represents alkyl, aralkyl, aryl or $-NR^6-R^7$.

* * * * *